US012248649B2

United States Patent
Wu et al.

(10) Patent No.: US 12,248,649 B2
(45) Date of Patent: Mar. 11, 2025

(54) TOUCH SENSOR WITH OVERLAPPING SENSING ELEMENTS FOR INPUT SURFACE DIFFERENTIATION

(71) Applicant: Google LLC, Mountain View, CA (US)

(72) Inventors: Tong Wu, Mountain View, CA (US); Shiho Fukuhara, Tokyo (JP)

(73) Assignee: GOOGLE LLC, Mountain View, CA (US)

( * ) Notice: Subject to any disclaimer, the term of this patent is extended or adjusted under 35 U.S.C. 154(b) by 55 days.

(21) Appl. No.: 18/247,761

(22) PCT Filed: Oct. 5, 2021

(86) PCT No.: PCT/US2021/053600
§ 371 (c)(1),
(2) Date: Apr. 4, 2023

(87) PCT Pub. No.: WO2022/076434
PCT Pub. Date: Apr. 14, 2022

(65) Prior Publication Data
US 2023/0376153 A1    Nov. 23, 2023

Related U.S. Application Data

(60) Provisional application No. 63/087,826, filed on Oct. 5, 2020.

(51) Int. Cl.
*G06F 3/044* (2006.01)
*G06F 3/041* (2006.01)

(52) U.S. Cl.
CPC ........ *G06F 3/0445* (2019.05); *G06F 3/04166* (2019.05); *G06F 2203/04102* (2013.01)

(58) Field of Classification Search
CPC ............... G06F 3/0445; G06F 3/04166; G06F 2203/04102
See application file for complete search history.

(56) References Cited

U.S. PATENT DOCUMENTS

2007/0248799 A1   10/2007  Deangeles et al.
2011/0318985 A1*  12/2011  McDermid ......... G06F 3/04164
                                                              442/189

(Continued)

OTHER PUBLICATIONS

International Search Report for Application No. PCT/US2021/053600, mailed on Feb. 8, 2022, 2 pages.

(Continued)

*Primary Examiner* — Adam J Snyder
(74) *Attorney, Agent, or Firm* — DORITY & MANNING P.A.

(57) ABSTRACT

A sensor system includes a touch sensor having a plurality of conductive sensing elements integrated with a flexible substrate. A first subset of sensing elements is coupled to a first side of the flexible substrate and a second subset of sensing elements is coupled to a second side of the flexible substrate. At least one sensing element of the first subset overlies a second sensing element and a third sensing element of the second subset. The sensor system is configured to obtain touch data based at least in part on a respective response to the touch input by the plurality of conductive sensing elements. The sensor system is configured to determine whether the touch input is associated with the first subset of conductive sensing elements or the second subset of conductive sensing elements based at least in part on the respective response to the touch input by the sensing elements.

17 Claims, 17 Drawing Sheets

(56) References Cited

U.S. PATENT DOCUMENTS

| | | | |
|---|---|---|---|
| 2014/0022466 A1 | 1/2014 | Lo et al. | |
| 2014/0062892 A1* | 3/2014 | Dickinson | G06F 3/0412 |
| | | | 345/173 |
| 2014/0318699 A1* | 10/2014 | Longinotti-Buitoni | ...................... |
| | | | H05K 1/095 |
| | | | 156/247 |
| 2016/0048235 A1* | 2/2016 | Poupyrev | G06F 3/0446 |
| | | | 345/174 |
| 2016/0048236 A1* | 2/2016 | Poupyrev | G06F 3/0445 |
| | | | 345/174 |
| 2016/0282988 A1* | 9/2016 | Poupyrev | G06F 3/0445 |
| 2016/0283101 A1* | 9/2016 | Schwesig | G06F 3/0445 |
| 2016/0284436 A1* | 9/2016 | Fukuhara | G06F 3/0446 |
| 2016/0345638 A1* | 12/2016 | Robinson | G06F 3/0446 |
| 2017/0060298 A1* | 3/2017 | Hwang | G06F 3/045 |
| 2017/0249033 A1* | 8/2017 | Podhajny | G06F 3/045 |
| 2017/0325337 A1* | 11/2017 | Karagozler | G06F 3/0447 |
| 2017/0325518 A1* | 11/2017 | Poupyrev | G06F 3/044 |
| 2017/0329425 A1* | 11/2017 | Karagozler | G06F 3/0445 |
| 2017/0336831 A1 | 11/2017 | Zhang et al. | |
| 2018/0260052 A1* | 9/2018 | Karagozler | G06F 3/0446 |
| 2018/0310659 A1* | 11/2018 | Poupyrev | G06F 3/147 |

OTHER PUBLICATIONS

International Preliminary Report on Patentability for Application No. PCT/US2021/053600, mailed Apr. 20, 2023, 8 pages.

* cited by examiner

TOUCH SENSOR WITH OVERLAPPING SENSING ELEMENTS FOR INPUT SURFACE DIFFERENTIATION

CROSS-REFERENCE TO RELATED APPLICATIONS

The present application is based upon and claims the right of priority under 35 U.S.C. § 371 to International Application No. PCT/US2021/053600 filed on Oct. 5, 2022, which is based on and claims benefit of U.S. Provisional Patent Application Ser. No. 63/087,826, filed Oct. 5, 2020. Applicant claims priority to and the benefit of each of such applications and incorporates all such applications herein by reference in their entirety.

FIELD

The present disclosure relates generally to touch sensors for interactive objects.

BACKGROUND

An interactive object can include conductive sensing elements such as conductive threads incorporated into the interactive object to form a sensor such as a capacitive touch sensor that is configured to detect touch input. The interactive object can process the touch input to generate touch data that is useable to initiate functionality locally at the interactive object or at various remote devices that are wirelessly coupled to the interactive object. Interactive objects may include conductive sensing elements for other purposes, such as for strain sensors using conductive threads and for visual interfaces using line optics.

An interactive object may be formed by forming a grid or array of conductive thread woven into an interactive textile, for example. Each conductive thread can include a conductive wire (e.g., a copper wire) that is twisted, braided, or wrapped with one or more flexible threads (e.g., polyester or cotton threads). It may be difficult, however, for traditional sensor designs with such conductive lines to be implemented within objects.

SUMMARY

Aspects and advantages of embodiments of the present disclosure will be set forth in part in the following description, or may be learned from the description, or may be learned through practice of the embodiments.

One example aspect of the present disclosure is directed to a sensor system including a flexible substrate having a first surface and a further, second surface. The flexible substrate defines a longitudinal direction and a lateral direction. The system includes a first subset of non-crossing sensing elements having a length in the longitudinal direction and a width in the lateral direction. The first subset of non-crossing sensing elements is coupled to the first surface of the flexible substrate. The system includes a second subset of non-crossing sensing elements having a length in the longitudinal direction and a width in the lateral direction. The second subset of non-crossing sensing elements is coupled to the second surface. A first sensing element of the first subset of non-crossing sensing elements overlaps, in the lateral direction, a portion of a second sensing element of the second subset of non-crossing sensing elements and a portion of a third sensing element of the second subset of non-crossing sensing elements. The system includes one or more control circuits configured to determine whether a touch input is associated with the first surface of the second surface based at least in part on a respective capacitive response to the touch input by the first sensing element, the second sensing element, and the third sensing element, the one or more control circuits configured to initiate a functionality based at least in part on a determined touch input surface.

Another example aspect of the present disclosure is directed to an interactive object including a touch sensor comprising a plurality of non-crossing sensing elements integrated with a flexible substrate. Each of the plurality of non-crossing sensing elements defining a length in a longitudinal direction and a width in a lateral direction. The plurality of non-crossing sensing elements includes a first subset of non-crossing sensing elements coupled to a first surface of the flexible substrate and a second subset of non-crossing sensing elements coupled to a second, further surface of the flexible substrate. The first subset of non-crossing sensing elements comprises a first non-crossing sensing element that overlaps, in the lateral direction, at least a portion of a second non-crossing sensing element and a third non-crossing sensing element of the second subset. The interactive object includes one or more control circuits configured to determine whether a touch input is associated with the first surface or the second surface based at least in part on a respective response to the touch input by the plurality of non-crossing sensing elements and to initiate a functionality in response to the touch input based at least in part on a determined surface to which the touch input is applied.

Yet another example aspect of the present disclosure is directed to a computer-implemented method of managing input at an interactive object. The method comprises obtaining, by one or more processors, touch data associated with a touch sensor comprising a plurality of non-crossing sensing elements integrated with a flexible substrate. Each of the plurality of non-crossing sensing elements defines a length in a longitudinal direction and a width in a lateral direction. The plurality of non-crossing sensing elements include a first subset of non-crossing sensing elements coupled to a first surface of the flexible substrate and a second subset of non-crossing sensing elements coupled to a second, further surface of the flexible substrate. The first subset of non-crossing sensing elements includes a first non-crossing sensing element that overlaps, in the lateral direction, at least a portion of a second non-crossing sensing element and a third non-crossing sensing element of the second subset. The method includes detecting, by the one or more processors, a respective response associated with each of the plurality of non-crossing sensing elements in response to a touch input to the touch sensor and determining, by the one or more processors, whether the touch input is associated with the first surface or the second surface based at least in part on the respective response associated with each of the plurality of non-crossing sensing elements.

Other example aspects of the present disclosure are directed to systems, apparatus, computer program products (such as tangible, non-transitory computer-readable media but also such as software which is downloadable over a communications network without necessarily being stored in non-transitory form), user interfaces, memory devices, and electronic devices for implementing and utilizing touch sensors such as capacitive touch sensors.

These and other features, aspects and advantages of various embodiments will become better understood with reference to the following description and appended claims.

The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
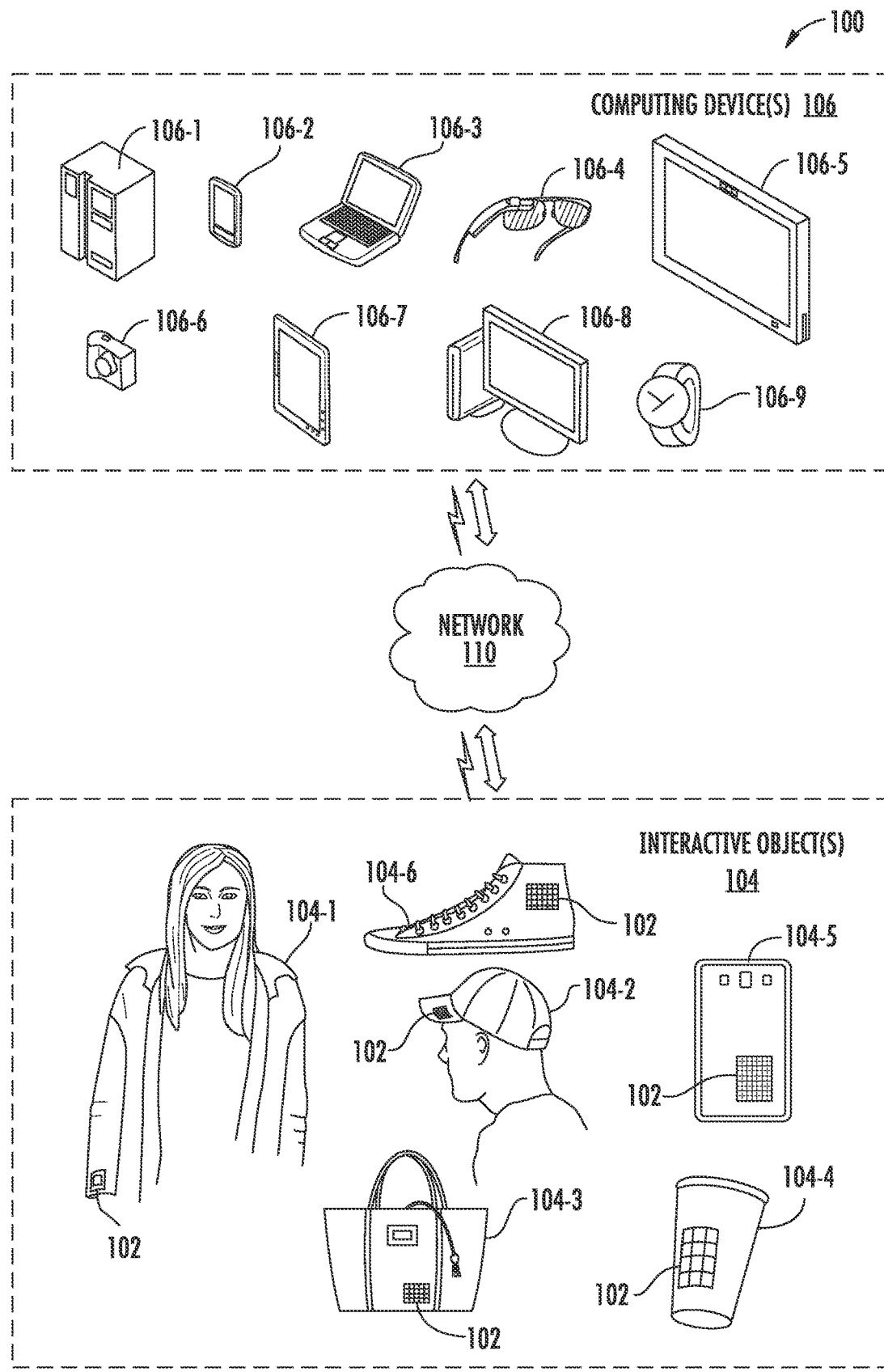
FIG. 1 illustrates an example computing environment including an interactive object having a touch sensor in accordance with example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to a sensor system including a touch sensor having a set of conductive sensing elements that can be integrated with at least one substrate to form an interactive object that is capable of distinguishing touch inputs received at a first surface from touch inputs received at a second surface of the touch sensor. More particularly, the sensing elements at each surface are arranged such that the sensing elements on a surface corresponding to a touch input attenuate or otherwise block electrical fields resulting from application of a scanning voltage to the sensing elements on a surface opposite to the touch input. Accordingly, the system will detect a larger capacitive response by the sensing elements on the surface corresponding to the touch input. In this manner, the system can determine a particular surface associated with a touch input by comparing the capacitive response of sensing elements on the first surface to the capacitive response of sensing elements on the second surface. In addition to determining the surface associated with a touch input, the system can utilize the response of sensing elements on both surfaces to classify a particular input received at a particular surface, thereby increasing the spatial resolution of the sensor.

By way of example, the sensor system can include a double-sided touch sensor formed by a set of conductive sensing elements including a first subset of conductive sensing elements coupled to a first surface of a flexible substrate and a second subset of conductive sensing elements coupled to a second surface of the flexible substrate. The first subset of conductive sensing elements can be a first subset of non-crossing conductive sensing lines and the second subset of conductive sensing elements can be a second subset of non-crossing conductive sensing lines. The first subset of non-crossing sensing lines can be elongated in a longitudinal direction with or without a spacing between sensing elements that are adjacent in a lateral direction orthogonal to the longitudinal direction. Similarly, the second subset of non-crossing sensing lines can be elongated in the longitudinal direction with or without a spacing between sensing elements that are adjacent in the lateral direction. In some examples, the first subset of sensing elements can be separated from the second subset in a vertical direction that is orthogonal to the lateral direction and the longitudinal direction. The non-crossing sensing elements may be referred to as parallel sensing elements as they extend in a longitudinal direction without crossing over or under one another in an orthogonal lateral direction.

In some embodiments, the set of non-crossing sensing elements can be configured such that non-crossing sensing elements of the first subset partially overlap non-crossing sensing elements of the second subset. For example, a sensing element of the first subset can partially overlap a sensing element of the second subset without intersecting or otherwise crossing underneath or over the sensing element of the second subset. For instance, the set of non-crossing sensing elements can form a sequence alternating between non-crossing sensing elements of the first subset and non-crossing sensing elements of the second subset without a spacing provided between sequential sensing elements that are adjacent in a lateral direction. In this manner, each non-crossing sensing element of the first subset overlaps at least a portion of a sequential non-crossing sensing element of the second subset that is adjacent in the lateral direction. For instance, a first non-crossing sensing element of the first subset can overlap portions of a second non-crossing sensing element and third non-crossing sensing element of the second subset in the lateral direction.

The system can differentiate touch inputs to the first surface and the second surface based on comparing a capacitive response of the first subset of conductive sensing elements with a capacitive response of the second subset of conductive sensing elements. Notably, the system can utilize the responses of sensing elements on both surfaces to classify an input received at a particular surface as a particular gesture.

More particularly, the two subsets of conductive sensing elements can be configured such that the first subset of sensing elements partially blocks or attenuates electrical fields that result from application of a scanning voltage to the second subset of sensing elements during a touch input at the first surface. Additionally or alternatively, the second subset of sensing elements can partially block or attenuate electrical fields that result from application of a scanning voltage to the first subset of sensing elements during a touch input at the second surface. For example, each of a subset of sensing elements on the first surface can be formed with a width that at least partially overlaps, in a lateral direction, a portion of one or more sensing elements on the second surface. For instance, each sensing element can include a first longitudinal edge and a second longitudinal edge that define the width of the sensing element. The first longitudinal edge of a first sensing element on the first surface can be laterally positioned between the first longitudinal edge and the second longitudinal edge of a second sensing element on the second surface and the second longitudinal edge of the first sensing element can be laterally positioned between the first longitudinal edge and the second longitudinal edge of a third sensing element on the second surface.

When a touch input is received at the first surface corresponding to the first subset of sensing elements, the second subset of sensing elements will not block or attenuate electrical fields resulting from application of the scanning voltage to the first subset. In this manner, the capacitive response of each sensing element of the second subset in response to a touch input at the first surface will be less than the capacitive response of each sensing element of the first subset in response to the touch input at the first surface. Similarly, the capacitive response of each sensing element of the first subset in response to a touch input at the second surface will be less than the capacitive response of each sensing element of the second subset in response to the touch input at the second surface. As such, the system can determine at which side of the touch sensor an input was received based on comparing the capacitive response of the first subset of sensing elements to the second subset of sensing elements.

More particularly, a reference potential such as ground or other suitably low voltage can be applied to the first subset of sensing elements when applying a control signal such as a scanning voltage to a sensing element of the second subset. If a touch input is received at the first surface, grounding the first subset of sensing elements can provide attenuation for signals or fields generated from sensing elements of the second subset while receiving the scanning voltage. The grounded first subset of sensing elements partially blocks electrical fields that result from the sensing element of the second subset that receives the scanning voltage while the touch input is applied. Likewise, for a touch input received at the second surface, grounding the second subset while applying the scanning voltage to the first subset can partially attenuate electrical fields resulting from the touch input. More particularly, a ground or other suitably low voltage can be applied to the second subset of sensing elements when applying a scanning voltage to sensing elements of the first subset. Grounding the second subset of sensing elements can provide attenuation for signals or fields generated from the sensing element of the first subset while receiving the scanning voltage.

As a result of grounding the non-selected sensing elements in this manner, the capacitive response detected in response to application of the scanning voltage will be less for sensing elements located opposite the side of or otherwise further from the touch input. The sensing elements disposed on an opposite surface of the touch input will exhibit a smaller capacitive response than the sensing elements on the surface at which the touch input is provided. Accordingly, the sensor system can determine whether an input is received at the first surface or the second surface based on the respective response of each of the sensing elements in response to the touch input. Notably, the electrical fields are only partially attenuated by grounding the elements opposite a line being scanned. As such, the system can utilize the responses of sensing elements on both surfaces to classify an input received at a particular surface as a particular gesture. Accordingly, example embodiments of the disclosed technology can provide an improved capability to distinguish touch inputs detected at different surfaces of a double-sided touch sensor. In addition to determining a surface at which a touch input is received, the system can use the response of sensing elements at both surfaces to classify gestures, thereby increasing the spatial resolution of the sensor at each surface.

In some examples, the touch sensor can be integrated with an interactive object such that intentional touch inputs provided at an intended input surface can be distinguished from inadvertent or unintentional inputs detected at an opposite surface adjacent to the body of a user when the interactive object is worn or otherwise carried by the user. In other examples, touch inputs provided at a first input surface can initiate different functionalities than touch inputs provided at a second input surface. Touch inputs at the different surfaces can be distinguished using a single set of conductive sensing elements, each of which may generate detectable responses (e.g., capacitances) in response to inputs at both surfaces. In this manner, example embodiments of the disclosed technology can provide an improved capability to distinguish touch inputs detected at different surfaces of a touch sensor. Moreover, in some examples, additional shielding layers that may typically be provided between the body of a user and a touch sensor can be avoided, thereby enabling tighter integration of the touch sensor with interactive objects such as wearable devices.

Embodiments of the disclosed technology provide a number of technical effects and benefits, particularly in the areas of computing technology, interactive objects, and the integration of the two. In particular, embodiments of the disclosed technology provide improved techniques for detecting inputs using touch sensors that are integrated with interactive objects such as wearable garments, garment accessories, and garment containers. For example, utilizing embodiments of the disclosed technology, touch inputs at an intended input surface of a touch sensor can be differentiated from inadvertent inputs received at a second surface of the touch sensor, such as may be adjacent to the body of a user when a wearable device is worn. In this manner, movement between the touch sensor and the user's body as may occur during everyday use can be distinguished from intentional inputs provided at the intended input surface of the touch sensor.

By utilizing a vertical separation and/or a flexible substrate between the subsets of flexible sensing elements, touch inputs to the first surface and the second surface can be differentiated without the utilization of a separate insulating or shielding layer between the user's body and the touch sensor. Moreover, by providing an overlapping sensing element architecture, a scanning technique that grounds unselected sensing elements results in attenuation of signals opposite a touch input surface. In this manner, the system can further enable input surface differentiation. In this manner, touch sensors in accordance with example embodiments can be formed without the inclusion of additional and often bulky materials. Such examples can facilitate a more streamlined integration of the touch sensor with various substrates such as textiles and the like.

In some examples, the utilization of different subsets of flexible sensing elements can provide for a larger number of detectable gestures by the touch sensor. For example, touch data indicative of a first input at a first surface can be associated with a first input gesture. The same or similar touch data indicative of an input at a second surface can be associated with a second input gesture. In this manner, the touch sensor can detect multiple gestures in response to the same input, dependent on whether the input is provided at a first surface or a second surface of the touch sensor.

With reference now to the figures, example aspects of the present disclosure will be discussed in greater detail.

FIG. 1 is an illustration of an example environment 100 in which an interactive object including a touch sensor can be implemented. Environment 100 includes a touch sensor 102 (e.g., capacitive touch sensor), or other sensor. Touch sensor 102 is shown as being integrated within various interactive objects 104. Touch sensor 102 may include one or more sensing elements such as conductive threads or other sensing lines that are configured to detect a touch input. In some examples, a capacitive touch sensor can be formed from an interactive textile that is configured to sense multi-touch-input. As described herein, a textile corresponds to any type of flexible woven material consisting of a network of natural or artificial fibers, often referred to as thread or yarn. Textiles may be formed by weaving, knitting, crocheting, knotting, pressing threads together or consolidating fibers or filaments together in a nonwoven manner. A capacitive touch sensor can be formed from any suitable conductive material and in other manners, such as by using flexible conductive lines including metal lines, filaments, etc. attached to a non-woven substrate.

In environment 100, interactive objects 104 include "flexible" objects, such as a shirt 104-1, a hat 104-2, a handbag 104-3 and a shoe 104-6. It is to be noted, however, that touch sensor 102 may be integrated within any type of flexible object made from fabric or a similar flexible material, such as garments or articles of clothing, garment accessories, garment containers, blankets, shower curtains, towels, sheets, bedspreads, or fabric casings of furniture, to name just a few. Examples of garment accessories may include sweat-wicking elastic bands to be worn around the head, wrist, or bicep. Other examples of garment accessories may be found in various wrist, arm, shoulder, knee, leg, and hip braces or compression sleeves. Headwear is another example of a garment accessory, e.g. sun visors, caps, and thermal balaclavas. Examples of garment containers may include waist or hip pouches, backpacks, handbags, satchels, hanging garment bags, and totes. Garment containers may be worn or carried by a user, as in the case of a backpack, or may hold their own weight, as in rolling luggage. Touch sensor 102 may be integrated within flexible objects 104 in a variety of different ways, including weaving, sewing, gluing, and so forth. Flexible objects may also be referred to as a "soft" objects.

In this example, objects 104 further include "hard" objects, such as a plastic cup 104-4 and a hard smart phone casing 104-5. It is to be noted, however, that hard objects 104 may include any type of "hard" or "rigid" object made from non-flexible or semi-flexible materials, such as plastic, metal, aluminum, and so on. For example, hard objects 104 may also include plastic chairs, water bottles, plastic balls, or car parts, to name just a few. In another example, hard objects 104 may also include garment accessories such as chest plates, helmets, goggles, shin guards, and elbow guards. Alternatively, the hard or semi-flexible garment accessory may be embodied by a shoe, cleat, boot, or sandal. Touch sensor 102 may be integrated within hard objects 104 using a variety of different manufacturing processes. In one or more implementations, injection molding is used to integrate touch sensors into hard objects 104.

Touch sensor 102 enables a user to control an object 104 with which the touch sensor 102 is integrated, or to control a variety of other computing devices 106 via a network 108. Computing devices 106 are illustrated with various non-limiting example devices: server 106-1, smart phone 106-2, laptop 106-3, computing spectacles 106-4, television 106-5, camera 106-6, tablet 106-7, desktop 106-8, and smart watch 106-9, though other devices may also be used, such as home automation and control systems, sound or entertainment systems, home appliances, security systems, netbooks, and e-readers. Note that computing device 106 can be wearable (e.g., computing spectacles and smart watches), non-wearable but mobile (e.g., laptops and tablets), or relatively immobile (e.g., desktops and servers). Computing device 106 may be a local computing device, such as a computing device that can be accessed over a Bluetooth connection, near-field communication connection, or other local-network connection. Computing device 106 may be a remote computing device, such as a computing device of a cloud computing system.

Network 108 includes one or more of many types of wireless or partly wireless communication networks, such as a local-area-network (LAN), a wireless local-area-network (WLAN), a personal-area-network (PAN), a wide-area-network (WAN), an intranet, the Internet, a peer-to-peer network, point-to-point network, a mesh network, and so forth.

Touch sensor 102 can interact with computing devices 106 by transmitting touch data or other sensor data through network 108. Additionally or alternatively, touch sensor 102 may transmit gesture data, movement data, or other data derived from sensor data generated by the touch sensor 102. Computing device 106 can use the touch data to control computing device 106 or applications at computing device 106. As an example, consider that touch sensor 102 integrated at shirt 104-1 may be configured to control the user's smart phone 106-2 in the user's pocket, television 106-5 in the user's home, smart watch 106-9 on the user's wrist, or various other appliances in the user's house, such as thermostats, lights, music, and so forth. For example, the user may be able to swipe up or down on touch sensor 102 integrated within the user's shirt 104-1 to cause the volume on television 106-5 to go up or down, to cause the temperature controlled by a thermostat in the user's house to increase or decrease, or to turn on and off lights in the user's house. Note that any type of touch, tap, swipe, hold, or stroke gesture may be recognized by touch sensor 102.

Figure 2:
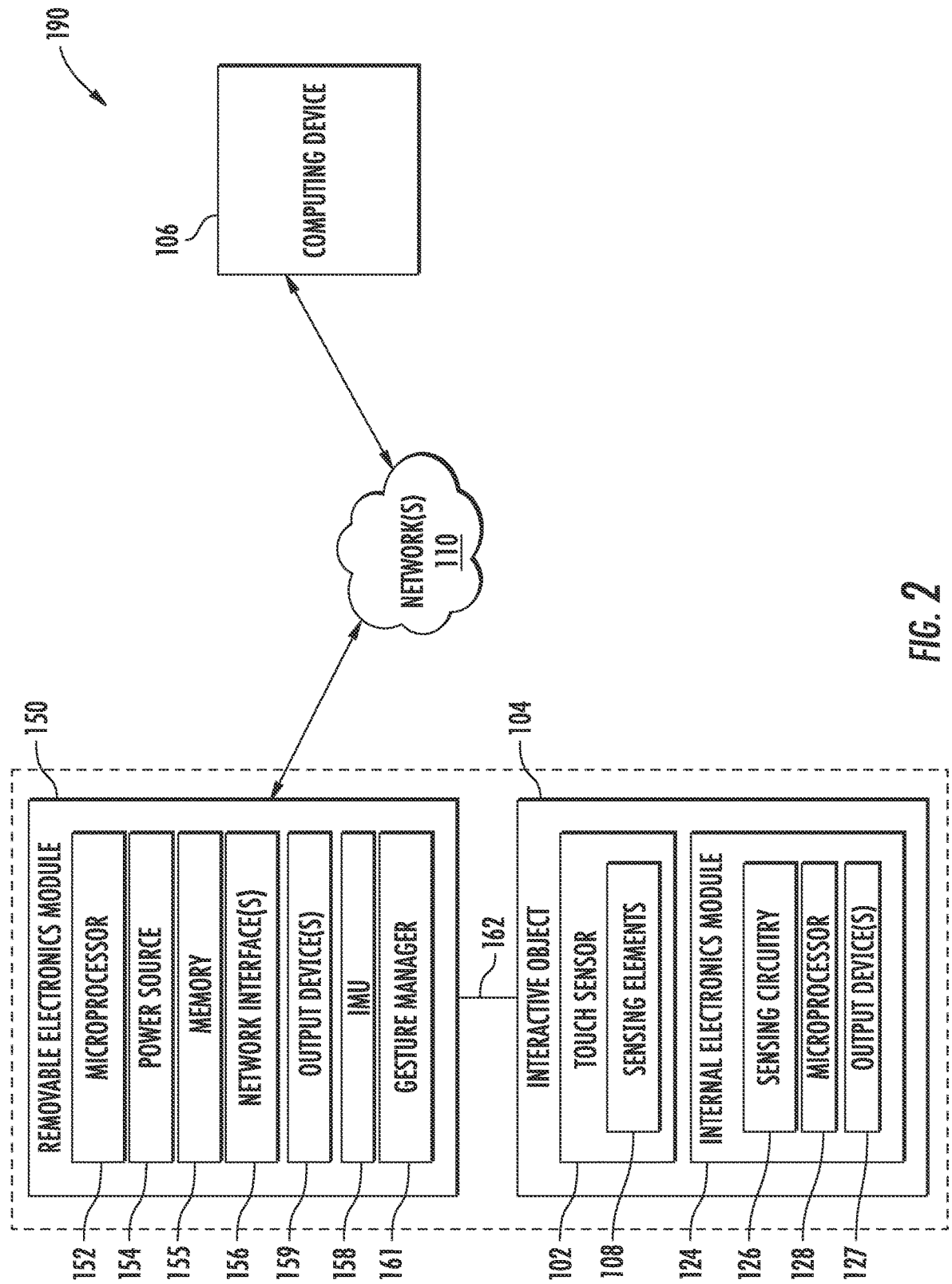
FIG. 2 is a block diagram of an example computing environment that includes an interactive object having a touch sensor in accordance with example embodiments of the present disclosure.

In more detail, consider FIG. 2 which illustrates an example system 190 that includes an interactive object 104, a removable electronics module 150, and a computing device 106. In system 190, touch sensor 102 is integrated in an object 104, which may be implemented as a flexible object (e.g., shirt 104-1, hat 104-2, or handbag 104-3) or a hard object (e.g., plastic cup 104-4 or smart phone casing 104-5).

Touch sensor 102 is configured to sense touch-input from a user when one or more fingers of the user's hand touch or approach touch sensor 102. Touch sensor 102 may be configured as a capacitive touch sensor to sense single-touch, multi-touch, and/or full-hand touch-input from a user. To enable the detection of touch-input, touch sensor 102 includes sensing elements 108. Sensing elements may include various shapes and geometries. In some examples, sensing elements 108 can be formed as a non-crossing pattern of sensing lines so as to detect touch input. In some implementations, the sensing elements 110 do not alter the flexibility of touch sensor 102, which enables touch sensor 102 to be easily integrated within interactive objects 104.

Interactive object 104 includes an internal electronics module 124 (also referred to as internal electronics device) that is embedded within interactive object 104 and is directly coupled to sensing elements 110. Internal electronics module 124 can be communicatively coupled to a removable electronics module 150 (also referred to as a removable electronics device) via a communication interface 162. Internal electronics module 124 contains a first subset of electronic circuits or components for the interactive object 104, and removable electronics module 150 contains a second, different, subset of electronic circuits or components for the interactive object 104. As described herein, the internal electronics module 124 may be physically and permanently embedded within interactive object 104, whereas the removable electronics module 150 may be removably coupled to interactive object 104.

In system 190, the electronic components contained within the internal electronics module 124 include sensing circuitry 126 that is coupled to sensing elements 108 that form the touch sensor 102. In some examples, the internal electronics module includes a flexible printed circuit board (PCB). The printed circuit board can include a set of contact pads for attaching to the conductive lines. In some examples, the printed circuit board includes a microprocessor. For example, wires from conductive threads may be connected to sensing circuitry 126 using flexible PCB, creping, gluing with conductive glue, soldering, and so forth. In one embodiment, the sensing circuitry 126 can be configured to detect a user-inputted touch-input on the conductive threads that is pre-programmed to indicate a certain request. In one embodiment, sensing circuitry 126 can be configured to detect the touch-input on a particular sensing element 108, as well as motion of the touch-input. The touch-input may then be used to generate touch data usable to control a computing device 106. For example, the touch-input can be used to determine various gestures, such as single-finger touches (e.g., touches, taps, and holds), multi-finger touches (e.g., two-finger touches, two-finger taps, two-finger holds, and pinches), single-finger and multi-finger swipes (e.g., swipe up, swipe down, swipe left, swipe right), and full-hand interactions (e.g., touching the textile with a user's entire hand, covering textile with the user's entire hand, pressing the textile with the user's entire hand, palm touches, and rolling, twisting, or rotating the user's hand while touching the textile).

Internal electronics module 124 can include various types of electronics, such as sensing circuitry 126, sensors (e.g., capacitive touch sensors woven into the garment, microphones, or accelerometers), output devices (e.g., LEDs, speakers, or micro-displays), electrical circuitry, and so forth. Removable electronics module 150 can include various electronics that are configured to connect and/or interface with the electronics of internal electronics module 124. Generally, the electronics contained within removable electronics module 150 are different than those contained within internal electronics module 124, and may include electronics such as microprocessor 152, power source 154 (e.g., a battery), memory 155, network interface 156 (e.g., Bluetooth, WiFi, USB), sensors (e.g., accelerometers, heart rate monitors, pedometers, IMUs), output devices (e.g., speakers, LEDs), and so forth.

In some examples, removable electronics module 150 is implemented as a strap or tag that contains the various electronics. The strap or tag, for example, can be formed from a material such as rubber, nylon, plastic, metal, or any other type of fabric. Notably, however, removable electronics module 150 may take any type of form. For example, rather than being a strap, removable electronics module 150 could resemble a circular or square piece of material (e.g., rubber or nylon).

The inertial measurement unit(s) (IMU(s)) 158 can generate sensor data indicative of a position, velocity, and/or an acceleration of the interactive object. The IMU(s) 158 may generate one or more outputs describing one or more three-dimensional motions of the interactive object 104. The IMU(s) may be secured to the internal electronics module 124, for example, with zero degrees of freedom, either removably or irremovably, such that the inertial measurement unit translates and is reoriented as the interactive object 104 is translated and are reoriented. In some embodiments, the inertial measurement unit(s) 158 may include a gyroscope or an accelerometer (e.g., a combination of a gyroscope and an accelerometer), such as a three axis gyroscope or accelerometer configured to sense rotation and acceleration along and about three, generally orthogonal axes. In some embodiments, the inertial measurement unit(s) may include a sensor configured to detect changes in velocity or changes in rotational velocity of the interactive object and an integrator configured to integrate signals from the sensor such that a net movement may be calculated, for instance by a processor of the inertial measurement unit, based on an integrated movement about or along each of a plurality of axes.

Communication interface 162 enables the transfer of power and data (e.g., the touch-input detected by sensing circuitry 126) between the internal electronics module 124 and the removable electronics module 260. In some implementations, communication interface 162 may be implemented as a connector that includes a connector plug and a connector receptacle. The connector plug may be implemented at the removable electronics module 150 and is configured to connect to the connector receptacle, which may be implemented at the interactive object 104. One or more communication interface(s) may be included in some examples. For instance, a first communication interface may physically couple the removable electronics module 150 to one or more computing devices 106, and a second communication interface may physically couple the removable electronics module 150 to interactive object 104.

In system 190, the removable electronics module 150 includes a microprocessor 152, power source 154, and network interface 156. Power source 154 may be coupled, via communication interface 162, to sensing circuitry 126 to provide power to sensing circuitry 126 to enable the detection of touch-input, and may be implemented as a small battery. When touch-input is detected by sensing circuitry 126 of the internal electronics module 124, data representative of the touch-input may be communicated, via communication interface 162, to microprocessor 152 of the removable electronics module 150. Microprocessor 152 may then analyze the touch-input data to generate one or more control signals, which may then be communicated to a computing device 106 (e.g., a smart phone, server, cloud computing infrastructure, etc.) via the network interface 156 to cause the computing device to initiate a particular functionality. Generally, network interfaces 156 are configured to communicate data, such as touch data, over wired, wireless, or optical networks to computing devices. By way of example and not limitation, network interfaces 156 may communicate data over a local-area-network (LAN), a wireless local-area-network (WLAN), a personal-area-network (PAN) (e.g., Bluetooth™), a wide-area-network (WAN), an intranet, the Internet, a peer-to-peer network, point-to-point network, a mesh network, and the like (e.g., through network 108 of FIG. 1 and FIG. 2).

Object 104 may also include one or more output devices 127 configured to provide a haptic response, a tactical response, an audio response, a visual response, or some combination thereof. Similarly, removable electronics module 150 may include one or more output devices 159 configured to provide a haptic response, tactical response, and audio response, a visual response, or some combination thereof. Output devices may include visual output devices, such as one or more light-emitting diodes (LEDs), audio output devices such as one or more speakers, one or more tactile output devices, and/or one or more haptic output devices. In some examples, the one or more output devices are formed as part of removable electronics module, although this is not required. In one example, an output device can include one or more LEDs configured to provide different types of output signals. For example, the one or more LEDs can be configured to generate a circular pattern of light, such as by controlling the order and/or timing of individual LED activations. Other lights and techniques may be used to generate visual patterns including circular patterns. In some examples, one or more LEDs may produce different colored light to provide different types of visual indications. Output devices may include a haptic or tactile output device that provides different types of output signals in the form of different vibrations and/or vibration patterns. In yet another example, output devices may include a haptic output device such as may tighten or loosen an interactive garment with respect to a user. For example, a clamp, clasp, cuff, pleat, pleat actuator, band (e.g., contraction band), or other device may be used to adjust the fit of a garment on a user (e.g., tighten and/or loosen). In some examples, an interactive textile may be configured to tighten a garment such as by actuating conductive threads within the touch sensor 102.

A gesture manager 161 is capable of interacting with applications at computing devices 106 and touch sensor 102 effective to aid, in some cases, control of applications through touch-input received by touch sensor 102. For example, gesture manager 161 can interact with applications. In FIG. 2, gesture manager 161 is illustrated as implemented at removable electronics module 150. It will be appreciated, however, that gesture manager 161 may be implemented at internal electronics module 124, a computing device 106 remote from the interactive object, or some combination thereof. A gesture manager may be implemented as a standalone application in some embodiments. In other embodiments, a gesture manager may be incorporated with one or more applications at a computing device.

A gesture or other predetermined motion can be determined based on touch data detected by the touch sensor 102 and/or an inertial measurement unit 158 or other sensor. For example, gesture manager 161 can determine a gesture based on touch data, such as single-finger touch gesture, a double-tap gesture, a two-finger touch gesture, a swipe gesture, and so forth. As another example, gesture manager 161 can determine a gesture based on movement data such as a velocity, acceleration, etc. as can be determined by inertial measurement unit 158.

A functionality associated with a gesture can be determined by gesture manager 161 and/or an application at a computing device. In some examples, it is determined whether the touch data corresponds to a request to perform a particular functionality. For example, the motion manager determines whether touch data corresponds to a user input or gesture that is mapped to a particular functionality, such as initiating a vehicle service, triggering a text message or other notification, answering a phone call, creating a journal entry, and so forth. As described throughout, any type of user input or gesture may be used to trigger the functionality, such as swiping, tapping, or holding touch sensor 102. In one or more implementations, a motion manager enables application developers or users to configure the types of user input or gestures that can be used to trigger various different types of functionalities. For example, a motion manager can cause a particular functionality to be performed, such as by sending a text message or other communication, answering a phone call, creating a journal entry, increase the volume on a television, turn on lights in the user's house, open the automatic garage door of the user's house, and so forth.

While internal electronics module 124 and removable electronics module 150 are illustrated and described as including specific electronic components, it is to be appreciated that these modules may be configured in a variety of different ways. For example, in some cases, electronic components described as being contained within internal electronics module 124 may be at least partially implemented at the removable electronics module 150, and vice versa. Furthermore, internal electronics module 124 and removable electronics module 150 may include electronic components other that those illustrated in FIG. 2, such as sensors, light sources (e.g., LED's), displays, speakers, and so forth.

Figure 3:
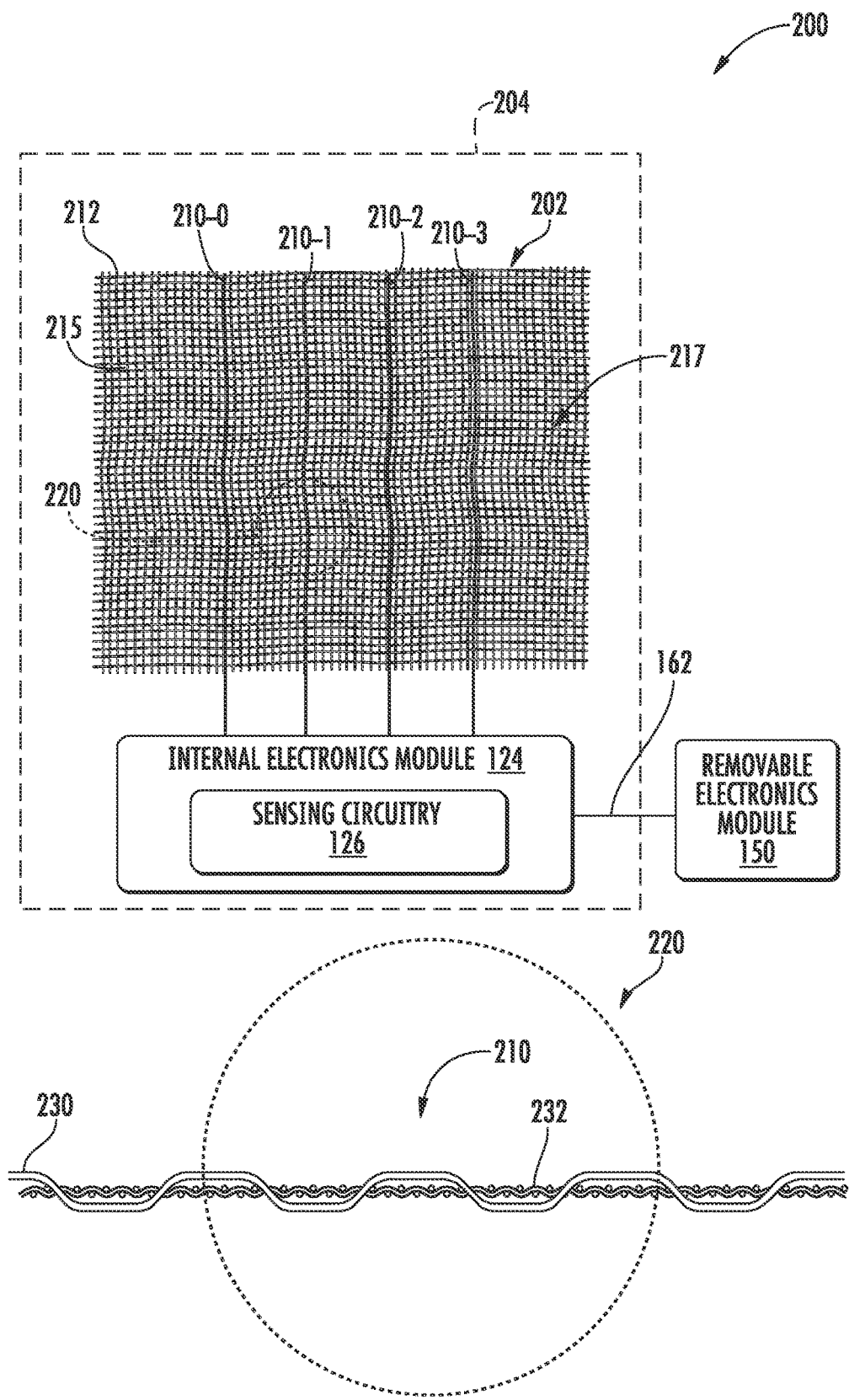
FIG. 3 depicts an example of a touch sensor in accordance with example embodiments of the present disclosure.

FIG. 3 illustrates an example of a sensor system 200, such as can be integrated with an interactive object 204 in accordance with one or more implementations. In this example, the sensing elements 108 are implemented as conductive threads 210 on or within a substrate 215. Touch sensor 202 includes non-conductive threads 212 woven with conductive threads 210 to form a capacitive touch sensor 202 (e.g., interactive textile). It is noted that a similar arrangement may be used to form a resistive touch sensor. Non-conductive threads 212 may correspond to any type of non-conductive thread, fiber, or fabric, such as cotton, wool, silk, nylon, polyester, and so forth.

At 220, a zoomed-in view of conductive thread 210 is illustrated. Conductive thread 210 includes a conductive wire 230 or a plurality of conductive filaments that are twisted, braided, or wrapped with a flexible thread 232. As shown, the conductive thread 210 can be woven with or otherwise integrated with the non-conductive threads 212 to form a fabric or a textile. Although a conductive thread and textile is illustrated, it will be appreciated that other types of sensing elements and substrates may be used, such as flexible metal lines formed on a plastic substrate.

In one or more implementations, conductive wire 230 is a thin copper wire. It is to be noted, however, that the conductive wire 230 may also be implemented using other materials, such as silver, gold, or other materials coated with a conductive polymer. The conductive wire 230 may include an outer cover layer formed by braiding together non-conductive threads. The flexible thread 232 may be implemented as any type of flexible thread or fiber, such as cotton, wool, silk, nylon, polyester, and so forth.

Capacitive touch sensor 202 can be formed cost-effectively and efficiently, using any conventional weaving process (e.g., jacquard weaving or 3D-weaving), which involves interlacing a set of longer threads (called the warp) with a set of crossing threads (called the weft). Weaving may be implemented on a frame or machine known as a loom, of which there are a number of types. Thus, a loom can weave non-conductive threads 212 with conductive threads 210 to create capacitive touch sensor 202. In another example, capacitive touch sensor 202 can be formed using a predefined arrangement of sensing lines formed from a conductive fabric such as an electro-magnetic fabric including one or more metal layers.

The conductive threads 210 can be formed into the touch sensor 202 in any suitable pattern or array. In one embodiment, for instance, the conductive threads 210 may form a single series of non-crossing threads. For instance, in one embodiment, the capacitive touch sensor may comprise a single plurality of non-crossing conductive threads conveniently located on the interactive object, such as on the sleeve of a jacket.

In example system 200, sensing circuitry 126 is shown as being integrated within object 104, and is directly connected to conductive threads 210. During operation, sensing circuitry 126 can detect touch-input to the conductive threads 210 using self-capacitance sensing, for example.

For instance, when configured as a self-capacitance sensor, sensing circuitry 126 can charge a selected conductive thread 210 by applying a control signal (e.g., a sine signal or square wave signal having a particular frequency) to the selected conductive thread 210. The control signal may be referred to as a scanning voltage in some examples and the processing of determining the capacitance of a selected conductive thread may be referred to as scanning. In some examples, the control signal can be applied to a selected conductive thread while grounding or applying a low level voltage to the other conductive threads. When an object, such as the user's finger, touches or approaches a conductive thread 210, the capacitive coupling between the conductive thread 210 that is being scanned and system ground may be increased, which changes (e.g., increases or decreases) the capacitance sensed by the touched conductive thread 210. This process can be repeated by applying the scanning voltage to each selected conductive thread while grounding the remaining non-selected conductive threads. In some examples, the conductive threads can be scanned individually, proceeding through the set of conductive threads in sequence. In other examples, more than one conductive thread may be scanned simultaneously.

Sensing circuitry 126 uses the change in capacitance to identify the presence of the object (e.g., user's finger, stylus, etc.). When an object, such as the user's finger, touches the conductive thread(s), the capacitance changes on the conductive threads (e.g., increases or decreases). Sensing circuitry 126 uses the change in capacitance on conductive threads to identify the presence of the object. To do so, sensing circuitry 126 detects a position of the touch-input by scanning the conductive threads to detect changes in capacitance. Sensing circuitry 126 determines the position of the touch-input based on conductive threads having a changed capacitance.

The conductive thread 210 and sensing circuitry 126 can be configured to communicate the touch data that is representative of the detected touch-input to gesture manager 161 (e.g., at removable electronics module 150). The microprocessor 152 may then cause communication of the touch data, via network interface 156, to computing device 106 to enable the device to determine gestures based on the touch data, which can be used to control object 104, computing device 106, or applications implemented at computing device 106. In some implementations, a predefined motion may be determined by the internal electronics module and/or the removable electronics module and data indicative of the predefined motion can be communicated to a computing device 106 to control object 104, computing device 106, or applications implemented at computing device 106.

The plurality of conductive threads 210 forming touch sensor 202 are integrated with non-conductive threads 212 to form flexible substrate 215. The sensing elements can be partitioned into subsets of sensing elements to enable the sensor system to distinguish between touch inputs at a first surface such as an intended touch input surface and touch inputs at a second, opposite surface such as an unintended surface in some examples. The second surface can be positioned toward a user's body when the interactive garment is worn in some examples. It is noted, however, that embodiments in accordance with the present disclosure can be used to detect and utilize inputs at both surfaces in some examples.

In accordance with embodiments of the present disclosure, a first subset of conductive threads 210-0 and 210-2 are coupled to a first side 217 of the flexible substrate and a second subset of conductive threads 210-1 in 210-3 are coupled to a second side (not shown) of the flexible substrate. The flexible substrate may be formed of one or more flexible substrate layers. The first side is opposite the second side in a direction orthogonal to first side and the second side. Any number of conductive threads may be used to form a touch sensor. Moreover, any number of conductive threads may be used to fund the individual subset example embodiments.

One or more control circuits of the sensor system 200 can obtain touch data associated with a touch input to touch sensor 202. The one or more control circuits can include sensing circuitry 126 and/or a computing device such as a microprocessor 128 at the internal electronics module, microprocessor 152 at the removable electronics module 150, and/or a remote computing device 106. The one or more control circuits can implement gesture manager 161 in example embodiments.

Sensing circuitry 126 can detect a response (e.g., capacitance) of each sensing element of the set in response to a touch input. Based on a respective response of each sensing element, the sensor system can determine whether a touch input is received at the first surface or the second surface. For instance, if at least one response (e.g., capacitance) of the first subset of sensing elements is greater than at least one respective response of the second subset of sensing elements, the sensor system can classify the touch input as having been received at the first surface of the touch sensor. If the at least one respective response of the second subset of sensing elements is greater than the at least one respective response of the first subset of sensing elements, however, the sensor system can classify the touch input as having been received at the second surface of the touch sensor.

By way of example, the sensor system can determine at least one signal difference associated with the first subset of conductive sensing elements and determine at least one signal difference associated with the second subset of conductive sensing elements. The sensor system can determine that the touch input is associated with the first subset of conductive sensing elements if the at least one signal difference associated with the first subset of conductive sensing elements is greater than the at least one signal difference associated with the second subset of conductive sensing elements. The sensor system can determine that the touch input is associated with the second subset of conductive sensing elements if the at least one signal difference associated with the second subset of conductive sensing elements is greater than the at least one signal difference associated with the first subset of conductive sensing elements.

The touch data can include data associated with a respective response by each of the plurality of conductive threads 210. The touch data can include, for example, a capacitance associated with the conductive threads 210-0 and 210-1 at the top side of the substrate, as well as the conductive threads 210-1 and 210-3 at the bottom side of the substrate. The control circuit(s) can determine whether the touch input is associated with the first subset of conductive threads 210-0, 201-2 or the second subset of thread 210-1, 210-3. The control circuit(s) can classify the touch input as associated with a particular subset based at least in part on the respective response to the touch input by the plurality of conductive sensing elements.

The control circuits(s) can be configured to detect a surface of the touch sensor at which a touch input is received, detect one or more gestures or other user movements in response to touch data associated with a touch input, and/or initiate one or more actions in response to detecting the gesture or other user movement. By way of example, control circuit(s) can obtain touch data that is generated in response to a touch input to touch sensor 202. The touch data can be based at least in part on a response (e.g., capacitance) associated with sensing elements from each subset of sensing elements. The control circuit(s) can determine whether the touch input is associated with a first surface of the touch sensor or a second surface of the touch sensor based at least in part on the response associated with the first sensing element and the response associated with the second sensing element. The control circuit(s) can selectively determine whether a touch input corresponds to a particular input gesture based at least in part on whether the touch input is determined to have been received at first surface of the touch sensor or a second surface of the touch sensor. Notably, the control circuit(s) can analyze the touch data from each subset of sensing elements to determine whether a particular gesture has been performed. In this regard, the control circuits can utilize the individual subsets of elements to identify particular surface of the touch sensor. However, the control circuits can utilize the full set of sensing elements to identify whether a gesture has been performed. In this manner, the spatial resolution afforded by all of the sensing element can be utilized to determine whether a particular input has been provided.

The gesture manager can examine the signal output associated with the sensing elements to determine or classify a touch input as being associated with a particular surface of the touch sensor. For example, the sensor system can determine whether one or more responses associated with a first subset of sensing elements is higher than one or more responses associated with a second subset of sensing elements. If the one or more responses of the first subset are higher, the sensor system can associate the touch input with a first surface of the touch sensor. If, however, the one or more responses of the second subset are higher, the sensor system can associate the touch input with a second surface of the touch sensor.

Figure 4:
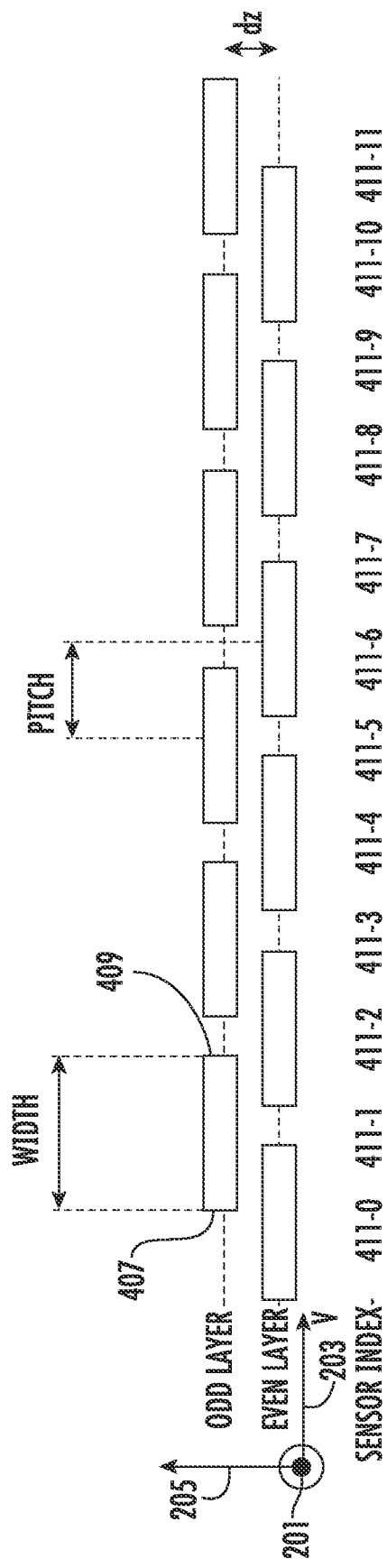
FIG. 4 is a cross-sectional view of an example of individual subsets of sensing lines, illustrating an overlap of a first subset of sensing lines and a second subset of sensing lines in accordance with example embodiments of the present disclosure.

FIG. 4 is a cross-sectional view depicting an example of a sensor system 400 including a touch sensor 402 including individual subsets of sensing elements formed on opposite sides of a substrate in accordance with example embodiments of the present disclosure. Each conductive sensing element 411 of the plurality of conductive sensing elements can be coupled to a substrate. Each sensing element is a conductive sensing line that is elongated in a longitudinal direction corresponding to longitudinal axis 201 with a spacing between conductive sensing elements that are adjacent in the lateral direction corresponding to lateral axis 203.

The set of conductive sensing elements 411 can be coupled to opposite sides of a flexible substrate. For example, a first subset of conductive sensing elements 411-0, 411-2, 411-4, 411-6, and 411-8 can be coupled to a first side of the flexible substrate and a second subset of conductive sensing elements 411-1, 411-3, 411-5, 411-7, and 411-9 can be coupled to a second side of the flexible substrate. The first and second sides can be opposite sides in a direction along the vertical axis 205, orthogonal to the first and second surfaces of the touch sensor. Each sensing element of the first subset is separated in the lateral direction from at least one other sensing line of the second subset. The distance between adjacent sensing elements in the lateral direction may be referred to as a pitch. In some examples, the first subset of conductive sensing elements and the second subset of conductive sensing elements can be separated by a distance dz in the vertical direction orthogonal to the first surface and the second surface of the touch sensor as shown in FIG. 4. The center of each sensing element of the first subset defines a first plane that extends along the longitudinal axis 201 and lateral axis 203. The first subset of sensing elements may be referred to as an even layer of sensing elements. The center of each sensing line of the second subset defines a second plane that extends along the longitudinal axis 201 and lateral axis 203. The second subset of sensing elements may be referred to as an odd layer of sensing elements. The first plane and the second plane are separated in a vertical direction along the vertical axis 205. In other examples, however, the first subset of conductive sensing elements and the second subset of sensing elements can be formed in the same vertical plane, without a vertical spacing therebetween. The vertical separation or distance dz between the subsets of sensing lines can enhance the distinguishability of inputs at a first surface of the touch sensor from inputs at a second surface of the touch sensor.

The set of sensing elements 411 can be formed by interleaving the first subset of sensing elements 411-0, 411-2, 411-4, 411-6, and 411-8 with the second subset of sensing elements 411-1, 411-3, 411-5, 411-7, and 411-9. For instance, alternating ones of the set of conductive sensing elements can be formed on the first side and the second side of the substrate such that the first subset of conductive sensing elements is formed on the first side and the second subset of sensing elements is formed on the second side. In FIG. 4, alternating ones of the set of sensing elements are on the first side and the second side such that an equal number of sensing element are formed on each side. In other examples, an unequal number of sensing elements can be formed on each side. The set of flexible conductive sensing elements can form a sequence with a spacing provided between sequential sensing lines that are adjacent in the direction of lateral axis 203. The sequence of flexible conductive sensing elements in the lateral direction can form the subset of even sensing elements 411-0, 411-2, 411-4, 411-6, and 411-8 and the subset of odd sensing elements 411-1, 411-3, 411-5, 411-7, and 411-9.

The set of conductive sensing elements 411 in this example is a set of non-crossing sensing lines that are elongated in the direction of the longitudinal axis 201 with a spacing between sensing lines that are adjacent in the lateral direction 203 orthogonal to the longitudinal direction. For instance, the set of sensing lines can be elongated in a longitudinal direction with a spacing between the conductive sensing lines that are adjacent in a lateral direction. The first subset non-crossing sensing lines at the first surface can be parallel lines that are elongated in the first direction, forming a conductive line pattern without intersecting or crossing underneath or over one another at an intended touch input area of the touch sensor. Likewise, the second subset non-crossing sensing lines at the second surface can be parallel lines that are elongated in the first direction, forming a conductive line pattern without intersecting or crossing underneath or over one another at an intended touch input area of the touch sensor.

The non-crossing lines of the first subset can form a conductive line pattern without intersecting or crossing underneath or over one another such that each sensing element has a same or similar starting point in the first direction and a same or similar ending point in the first direction. The first subset of sensing lines may be parallel sensing lines. Similarly, the non-crossing sensing lines of the second subset can be non-crossing lines that are elongated in the first direction. The second subset of sensing lines may be parallel sensing elements. For example, the non-crossing lines of the second subset can form a conductive line pattern without intersecting or crossing underneath or over one another such that each sensing line has a same or similar starting point in the first direction and a same or similar ending point in the first direction.

In some examples, the first side of a flexible substrate can be positioned closer to the intended touch input surface and the second side can be positioned further from the intended touch input surface and closer to the second surface which will be adjacent to the user when worn. For example, the first side can be adjacent to the intended touch input surface and the second side can be adjacent to one or more portions of the user's body when the interactive garment is worn by the user. By positioning subsets of sensing elements on opposite sides of the substrate, the capacitive signal generated by the user's body at the second surface can be distinguished from the capacitive signal generated by the touch input at the intended touch input surface.

In some examples, the set of conductive sensing elements can be coupled to opposite sides of a flexible substrate, with or without a vertical separation between the subsets of conductive sensing elements. For example, a first subset of conductive sensing elements can be coupled to a first side of the flexible substrate and a second subset of flexible sensing elements can be coupled to a second, further side of the flexible substrate. The first and second sides can be opposite sides in a direction orthogonal to the first and second surfaces of the touch sensor. In some examples, the first subset of conductive sensing elements and the second subset of conductive sensing elements can be separated by a distance in the direction orthogonal to the first surface and the second surface of the touch sensor. Touch inputs at the first surface and the second surface can be differentiated.

FIG. 4 graphically illustrates an overlap of the first subset of sensing elements and the second subset of sensing lines in accordance with example embodiments of the present disclosure. Each conductive sensing element of the first subset of conductive sensing elements overlaps, in the lateral direction, at least one conductive sensing element of the second subset of conductive sensing elements. By way of example, sensing element 411-1 of the odd layer partially overlaps sensing element 411-0 of the even layer and sensing element 411-2 of the even layer. Similarly, sensing element 411-3 of the odd layer partially overlaps sensing element 411-2 of the even layer and sensing element 411-4 of the even layer. Likewise, sensing elements 411-5, 411-7, and 411-9 each overlap two sensing elements of the even layer. Sensing element 411-11 at the end of the odd layer overlaps a single sensing element 411-10 of the even layer.

In the example of FIG. 4, each subset of conductive sensing elements includes neighboring sensing elements that are adjacent in the lateral direction with spaces disposed therebetween. By way of example, sensing elements 411-1 and 411-3 of the odd layer have a space therebetween. The set of conductive sensing elements each define a width in the lateral direction that is greater than the space of the space therebetween in the lateral direction.

Consider sensing element 411-1 more closely for example. Sensing element 411-3 has a first longitudinal edge 407 and a second longitudinal edge 409. Both longitudinal edges are elongated in the longitudinal direction at the first surface of the substrate. Sensing element 411-3 has a width in the lateral direction defined by the longitudinal edges. The width of sensing element 411-3 extends from the first longitudinal edge 407 to the second longitudinal edge 409. The first longitudinal edge 407 overlies sensing element 411-0 of the even layer. More particularly, the first longitudinal edge of sensing element is laterally positioned between the two longitudinal edges of sensing element 411-0. Similarly, the second longitudinal edge 409 overlies sensing element 411-2 of the even layer. The second longitudinal edge of sensing element 411-3 is laterally positioned between the two longitudinal edges of sensing element 411-2. In this manner, sensing element 411-1 has a width in the lateral direction that at least partially overlaps sensing element 411-2 and sensing element 411-4.

The width of sensing element 411-1 extends in the lateral direction beyond the size of the spaces between elements 411-0 and 411-2 such that sensing element 411-1 overlaps at least a portion of sensing elements 411-0 and 411-2. The overlap in the lateral direction can extend along the length of the sensing elements in the longitudinal direction. Notably, the sensing elements remain non-crossing. While sensing element 411-1 partially overlaps sensing element 411-0 in the lateral direction, the length of sensing element 411-1 does not cross over the width of sensing element 411-0 such that the two sensing elements remain non-crossing.

Any type of conductive line can be used in accordance with example embodiments of the present disclosure. By way of example, a conductive line may include a conductive thread, conductive fiber, fiber optic filaments, flexible metal lines, or other conductive line, etc. A conductive thread of an interactive textile may include a conductive core that includes at least one conductive wire and a cover layer constructed from flexible threads that cover the conductive core. The conductive core may be formed by twisting one or more flexible threads (e.g., silk threads, polyester threads, or cotton threads) with the conductive wire, or by wrapping flexible threads around the conductive wire. In some implementations, the conductive core may be formed by braiding the conductive wire with flexible threads (e.g., silk). The cover layer may be formed by wrapping or braiding flexible threads around the conductive core. In some implementations, the conductive thread is implemented with a "double-braided" structure in which the conductive core is formed by braiding flexible threads with a conductive wire, and then braiding flexible threads around the braided conductive core. At least a portion of each conductive thread can be connected to a flexible substrate, such as by weaving, embroidering, gluing, or otherwise attaching the conductive threads to the flexible substrate. In some examples, the conductive threads can be woven with a plurality of non-conductive threads to form the flexible substrate. Other types of conductive lines may be used in accordance with embodiments of the disclosed technology. Although many examples are provided with respect to conductive threads, it will be appreciated that any type of conductive line can be used with the touch sensor according to example embodiments.

In accordance with some embodiments, a plurality of sensing lines can be formed from a multilayered flexible film to facilitate a flexible sensing line. For example, the multilayered film may include one or more flexible base layers such as a flexible textile, plastic, or other flexible material. One or more metal layers may extend over the flexible base layer(s). Optionally, one or more passivation layers can extend over the one or more flexible base layers and the one or more metal layer(s) to promote adhesion between the metal layer(s) and the base layer(s). In accordance with some examples, a multilayered sheet including one or more flexible base layers, one or more metal layers, and optionally one or more passivation layers can be formed and then cut, etched, or otherwise divided into individual sensing lines. Each sensing line can include a line of the one or more metal layers formed over a line of the one or more flexible base layers. Optionally, a sensing line can include a line of one or more passivation layers overlying the one or more flexible base layers. An electromagnetic field shielding fabric can be used to form the sensing lines in some examples.

Figure 5:
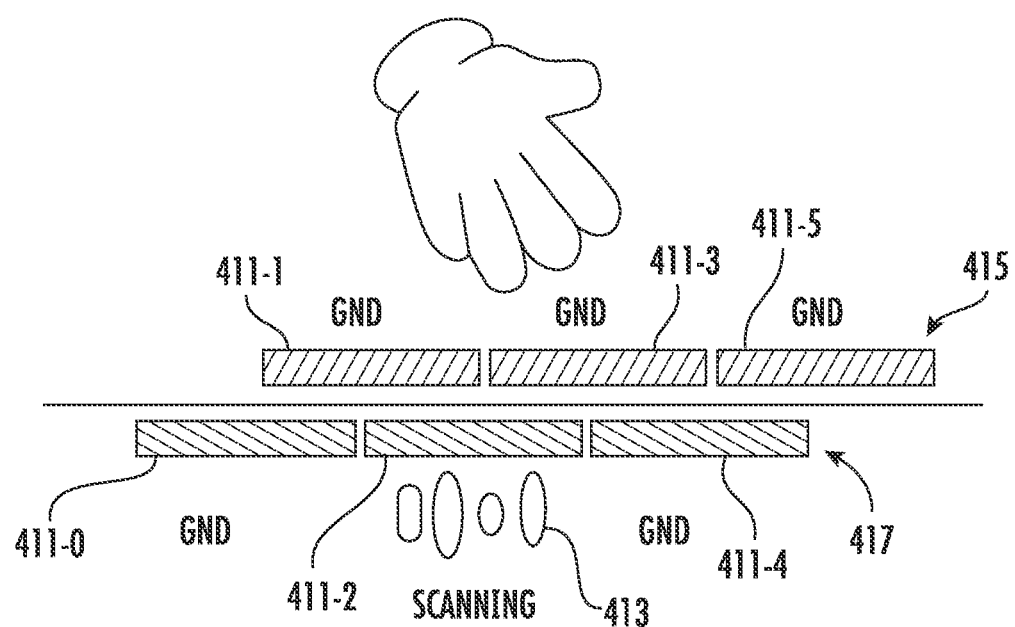
FIG. 5 depicts an example of capacitive sensing in accordance with example embodiments of the present disclosure, illustrating a touch input at a first surface, scanning a sensing line at a second surface, and applying a reference voltage to the remaining sensing lines in accordance with example embodiments of the present disclosure.
Figure 6:
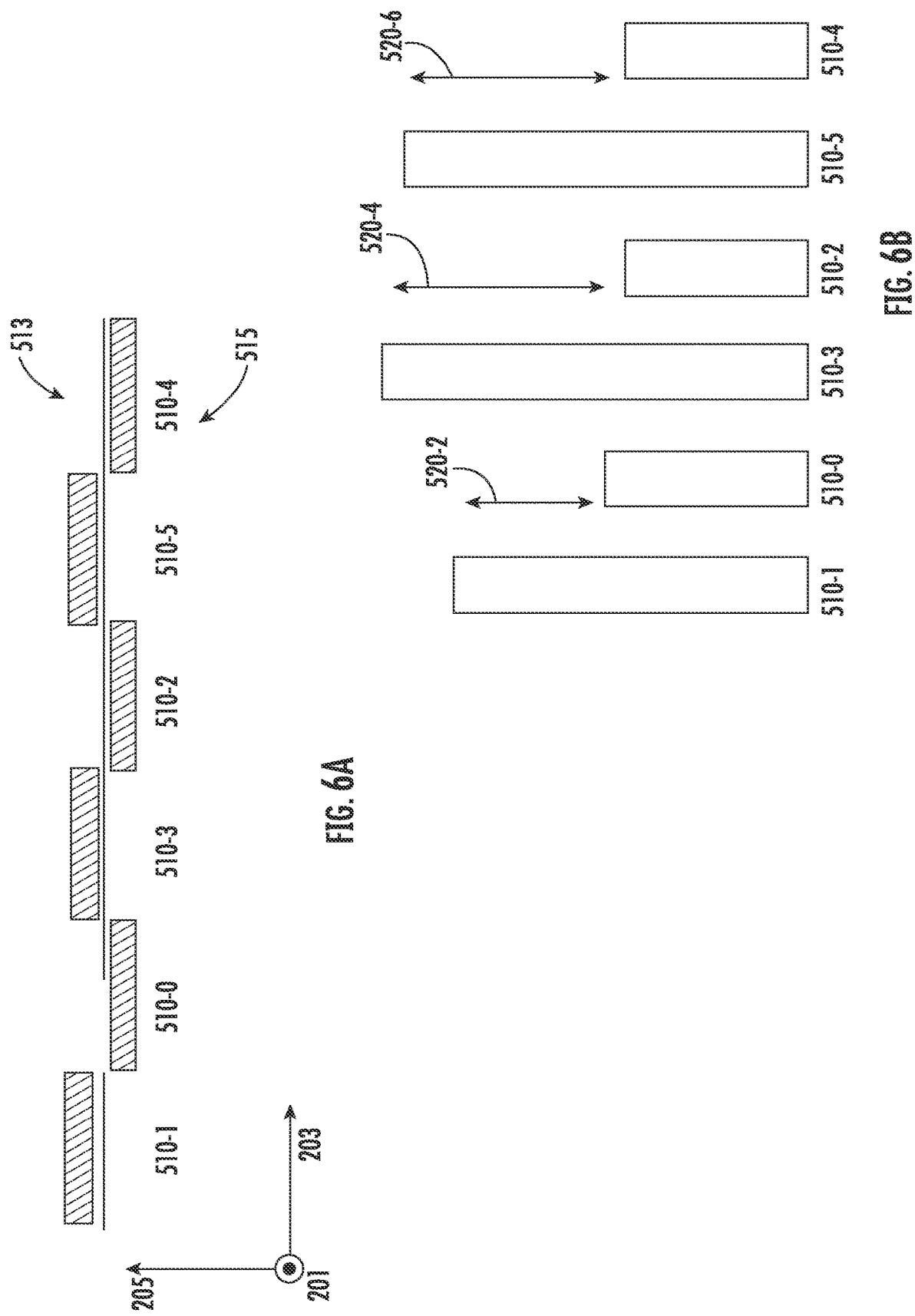
FIG. 6A is a cross-sectional view depicting an example set of sensing lines formed at multiple surfaces with non-overlapping subsets of sensing lines in accordance with example embodiments of the present disclosure.
FIG. 6B is a graphical diagram depicting an example sensor response to a touch input at a first surface of the touch sensor of FIG. 6A in accordance with example embodiments of the present disclosure.
Figure 7:
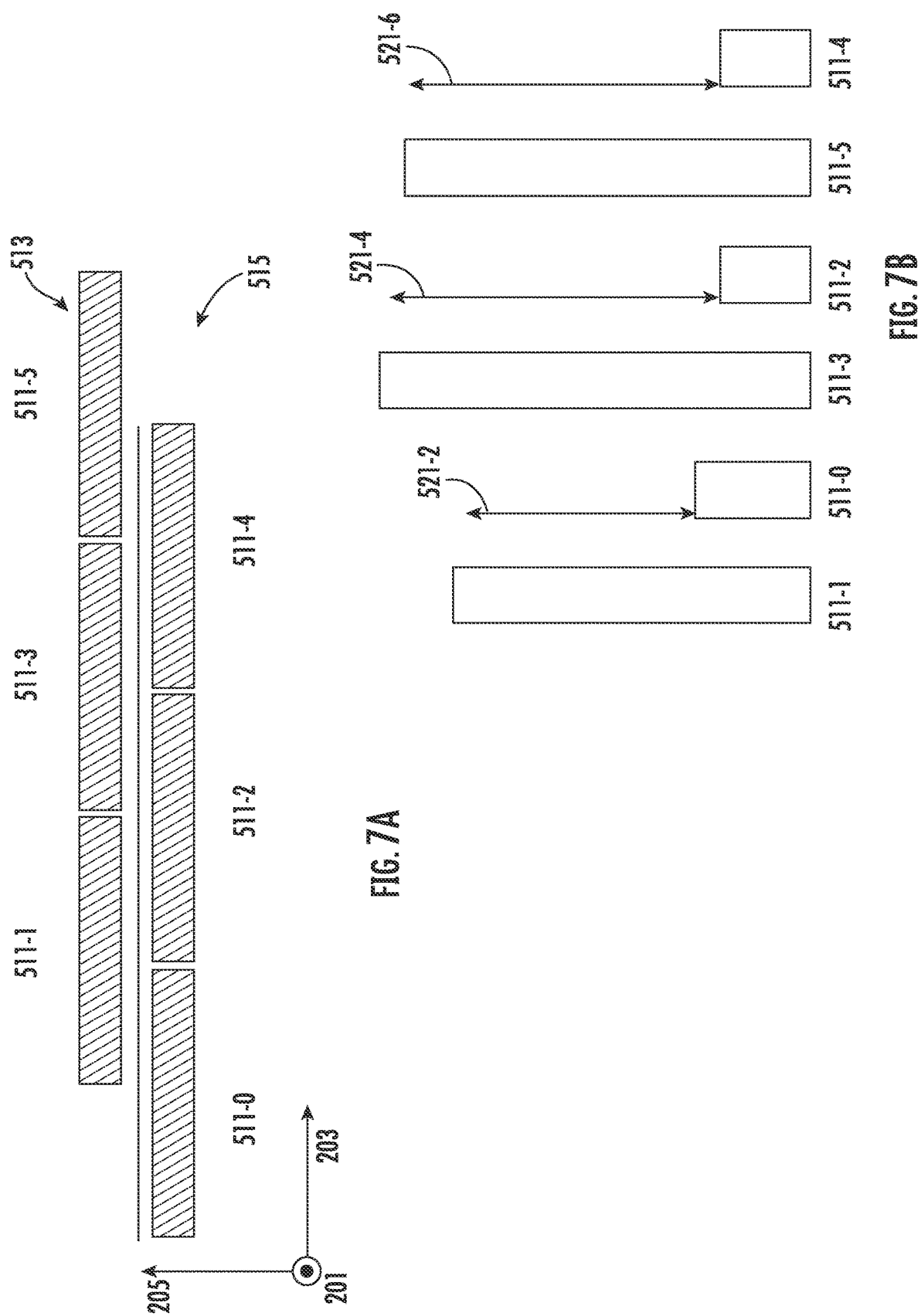
FIG. 7A is a cross-sectional view depicting an example set of sensing lines formed at multiple surfaces with sensing lines at a first surface partially overlapping sensing lines at a second surface in accordance with example embodiments of the present disclosure.
FIG. 7B is a graphical diagram depicting an example sensor response to a touch input at a first surface of the touch sensor of FIG. 7A in accordance with example embodiments of the present disclosure.

FIG. 5 is a graphical diagram depicting a touch input and a set of bias conditions for detecting the touch input by a touch sensor in accordance with example embodiments of the present disclosure. More particularly, FIG. 5 depicts a technique for differentiating inputs at a first surface from inputs at a second surface using partially overlapping sensing elements in accordance with example embodiments of the present disclosure. FIG. 5 depicts an example of capacitive sensing in accordance with example embodiments, illustrating a touch input at a first surface 415, scanning a sensing element at a second surface 417, and grounding the remaining sensing elements in accordance with example embodiments of the present disclosure. The capacitive sensing technique may be referred to as a self-capacitance sensing. FIG. 5 depicts an example sensor system configured to detect a response (e.g., capacitance) of each sensing element in response to touch input. Based on a respective response of each sensing element, the sensor system can determine whether touch input is received at a first surface or second surface of the touch sensor.

Control circuitry can implement a scanning process to detect touch input, determine which surface received the touch input, and identify a gesture associated with the touch input. For instance, the control circuitry can apply a control signal (e.g., a sine signal) such as scanning voltage 413 to sensing element 411-2 of a second subset of sensing elements including sensing elements 411-0, 411-2, and 411-4. The control circuitry can ground or apply a suitable low voltage to the remaining sensing elements 411-0 and 411-4 of the second subset and the sensing elements 411-1, 411-3, and 411-5 of a first subset of sensing elements. When the scanning voltage is applied to sensing element 411-2 at the second surface, electrical fields that result from the touch input are at least partially attenuated or blocked by the grounded sensing elements 411-1, 411-3, and 411-5 at the first surface. In this manner, a smaller capacitive response will be detected by the control circuitry for sensing element 411-2 in response to the touch input at the opposite surface due to the attenuation provided by grounding sensing elements 411-1, 411-3, and 411-5.

Now consider a touch input received at the first surface when the scanning voltage is applied to a sensing element such as sensing element 411-3 at the first surface. When applying the scanning voltage to sensing element 411-3, the remaining sensing elements including sensing elements 411-0, 411-2, and 411-4 are grounded. In this case, electrical fields that result from the touch input at the first surface are not attenuated by the grounded sensing elements at the second surface. Instead, the user's hand or other input object is opposite to the surface including the grounded sensing lines. In this manner, the electrical fields from the sensing element 411-3 will not be attenuated. Accordingly, in response to a touch input at the first surface, sensing element 411-3 at the first surface will exhibit a much larger capacitive response than sensing element 411-0 at the second surface. As such, a large difference in signals between the top layer of sensing elements and the lower layer of sensing elements will be observed, making it easier to detect the surface at which the input was received.

FIGS. 6A-7B are graphical diagrams depicting example sensor responses to touch inputs at different surfaces of touch input sensors, illustrating an improved differential capacitive sensor response that results from overlapping sensing elements at different input surfaces.

FIG. 6A is a cross-sectional view depicting an example set of sensing lines where a first subset of sensing lines at a first surface of the touch sensor do not overlap or substantially overlap a second subset of sensing lines at a second surface of the touch sensor. A first subset of non-crossing sensing elements 510-1, 510-3, and 510-5 are formed at a first surface 513 of the touch sensor and a second subset of non-crossing sensing elements 510-0, 510-2, and 510-4 are formed on an opposite, second surface 515 of the touch sensor. The first surface can be separated from the second surface in vertical direction 205. The first subset of sensing elements may be formed on a first side of a flexible substrate and the second subset of sensing elements may be formed on a second side of the flexible substate.

FIG. 6B illustrates an example sensor response of the touch sensor to a touch input provided at the first surface. For example, FIG. 6B can represent the sensor response to a touch input that swipes across the first input surface 513 in the lateral direction 203. To measure the capacitive response of a particular sensing element, control circuitry can apply a scanning voltage (e.g., sine wave signal) to the particular sensing element while grounding the remaining sensing elements. As FIG. 6B illustrates, sensing elements 510-1, 510-3, and 510-5 at the first surface respond to the touch input with a larger signal output (increased capacitance) relative to sensing elements 510-0, 510-2, and 510-4 at the second surface. For example, the signal difference between sensing element 510-1 at the first surface and adjacent sensing element 510-0 at the second surface is depicted as 520-2. The signal difference between sensing element 510-3 and adjacent sensing element 510-2 is depicted as 520-4. The signal difference between sensing element 510-5 and adjacent sensing element 510-4 is depicted as 520-6. Based on the larger capacitive response of the sensing elements at the first surface, the control circuitry can determine that the touch input was provided at the first surface.

FIG. 7A is a cross-sectional view depicting an example set of sensing lines where a first subset of sensing lines at a first surface 513 of the touch sensor partially overlap in the lateral direction a second subset of sensing lines at a second surface 515 of the touch sensor. A first subset 840 of sensing elements 511-1, 511-3, and 511-5 are formed on a first surface and a second subset 842 of sensing elements 511-2, 511-4, and 511-6 are formed on an opposite, second surface. FIG. 7B illustrates an example sensor response of the touch sensor to a touch input provided at the first surface 513.

Referring to FIG. 7B, sensing elements 511-1, 511-3, and 511-5 at the first surface respond to the touch input with a larger signal output (increased capacitance) relative to sensing elements 511-0, 511-2, and 511-4 at the second surface. The signal difference between sensing element 511-1 at the first surface and adjacent sensing element 511-0 at the second surface is depicted as 521-2. The signal difference between sensing element 511-3 and adjacent sensing element 511-2 is depicted as 521-4. The signal difference between sensing element 511-5 and adjacent sensing element 511-4 is depicted as 521-6.

In the example of FIG. 7A, the sensing elements at a particular surface are aligned with little space therebetween in the lateral direction. In this manner, when a grounding voltage is applied to the sensing elements at a surface opposite a touch input, the sensing elements will provide strong attenuation for signals from the sensing element receiving the scanning voltage. In response to a touch input, the electrical fields produced by the selected sensing element opposite the touch input surface will be at least partially blocked or attenuated by the grounded sensing lines. In this manner, the measured capacitive response of the selected sensing line will be lowered relative to the case where the sensing lines are not closely spaced. Although FIG. 7A shows an example where the sensing elements at each surface are separated in the lateral direction by a space, the sensing elements at a particular surface may partially overlap in the lateral direction in some examples.

Comparing FIGS. 6B and 7B, it can be seen that sensing element 510-0 at the second surface of the non-overlapping example in FIG. 6B has a much higher capacitive response to a touch input at the first surface relative to sensing element 511-0 at the second surface of the overlapping example in FIG. 7B. Because of the dense layout of sensing lines at the first surface in the example of FIG. 7B, grounding the sensing lines can provide similar properties to a grounded plane. Electrical fields associated with the selected sensing element at the second surface will be attenuated and result in a lower capacitive response as illustrated in FIG. 7B. Because of the lower response of sensing element 511-0, the signal difference 521-2 is much larger than the signal difference 520-2. A similar difference can be seen when comparing difference 521-4 and 520-4 and when comparing signal different 521-6 and 520-6. The larger signal difference improves the ability of the control circuitry to detect which surface received the touch input. The control circuitry can more readily differentiate the touch input surface using the signal differences illustrated in FIG. 7B than those illustrated in FIG. 6B.

Based on the larger capacitive response of the sensing elements at the first surface, the control circuitry can determine that the touch input was provided at the first surface.

In some examples, the one or more control circuits can determine whether at least one signal difference associated with the first subset of sensing elements is greater than at least one signal difference associated with the second subset of sensing elements. For instance, a control circuit can determine for each sensor line in the array a signal difference between the capacitance of such sensor line and the capacitance of its adjacent sensor line(s). An accumulated signal difference value for each sensor line in the first subset can be determined by combining (e.g., adding) the signal difference value for each sensing line in the first subset. An accumulated signal difference value for each sensor line in the second subset can be determined by combining the signal difference value for each sensing line in the second subset. The two accumulated signal difference values can be compared. If the accumulated signal difference value for the first subset is larger than the accumulated signal difference value for the second subset, the control circuit can determine that the touch input is received at the first surface of the touch sensor. If the accumulated signal difference value for the second subset is larger than the accumulated signal difference value for the first subset, the control circuit can determine that the touch input is received at the second surface of the touch sensor.

Figure 8:
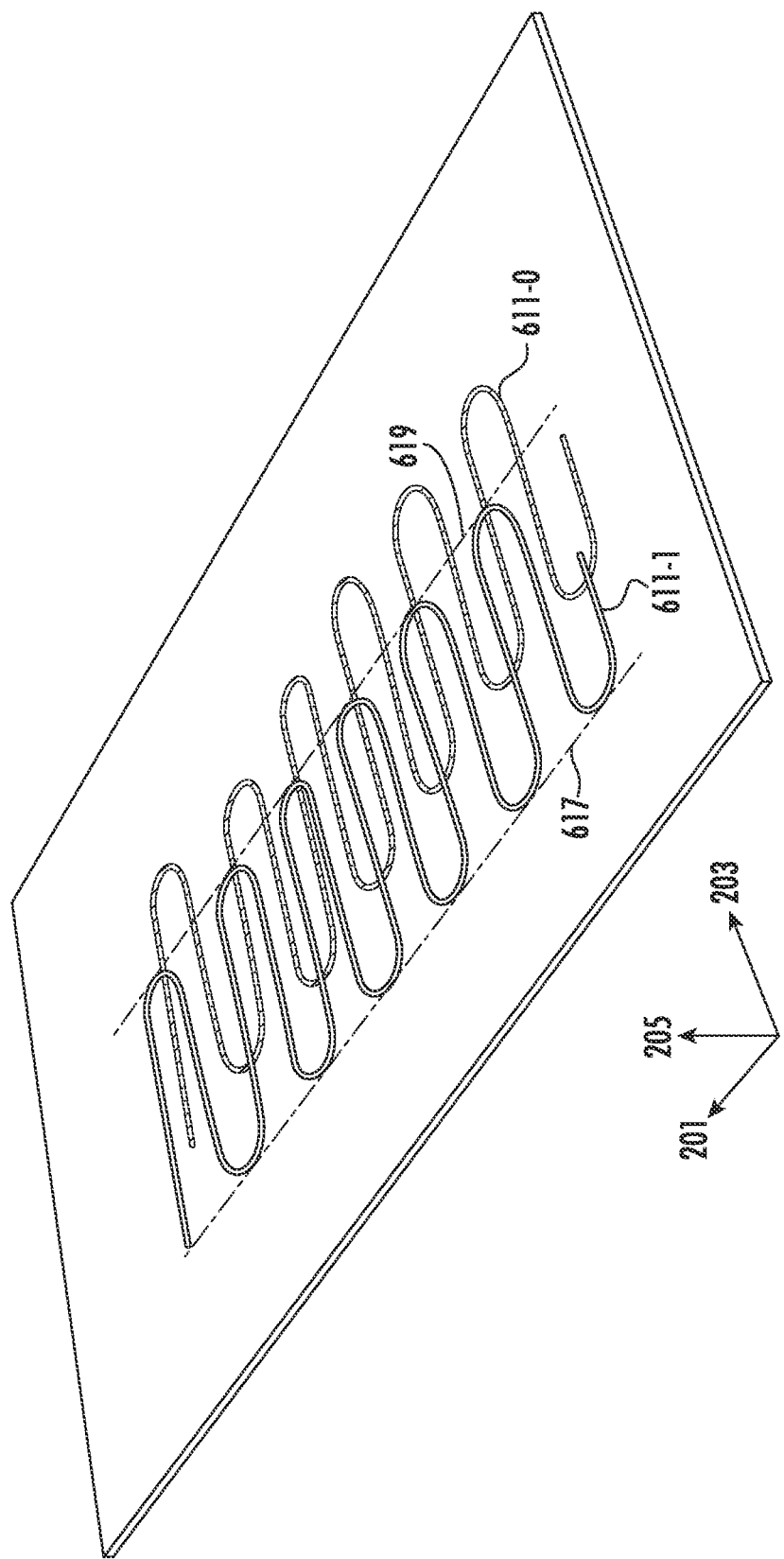
FIG. 8 is a perspective view depicting a portion of an example touch sensor including sensing elements formed from conductive threads coupled to opposite surfaces of a substrate in accordance with example embodiments of the present disclosure.
Figure 9:
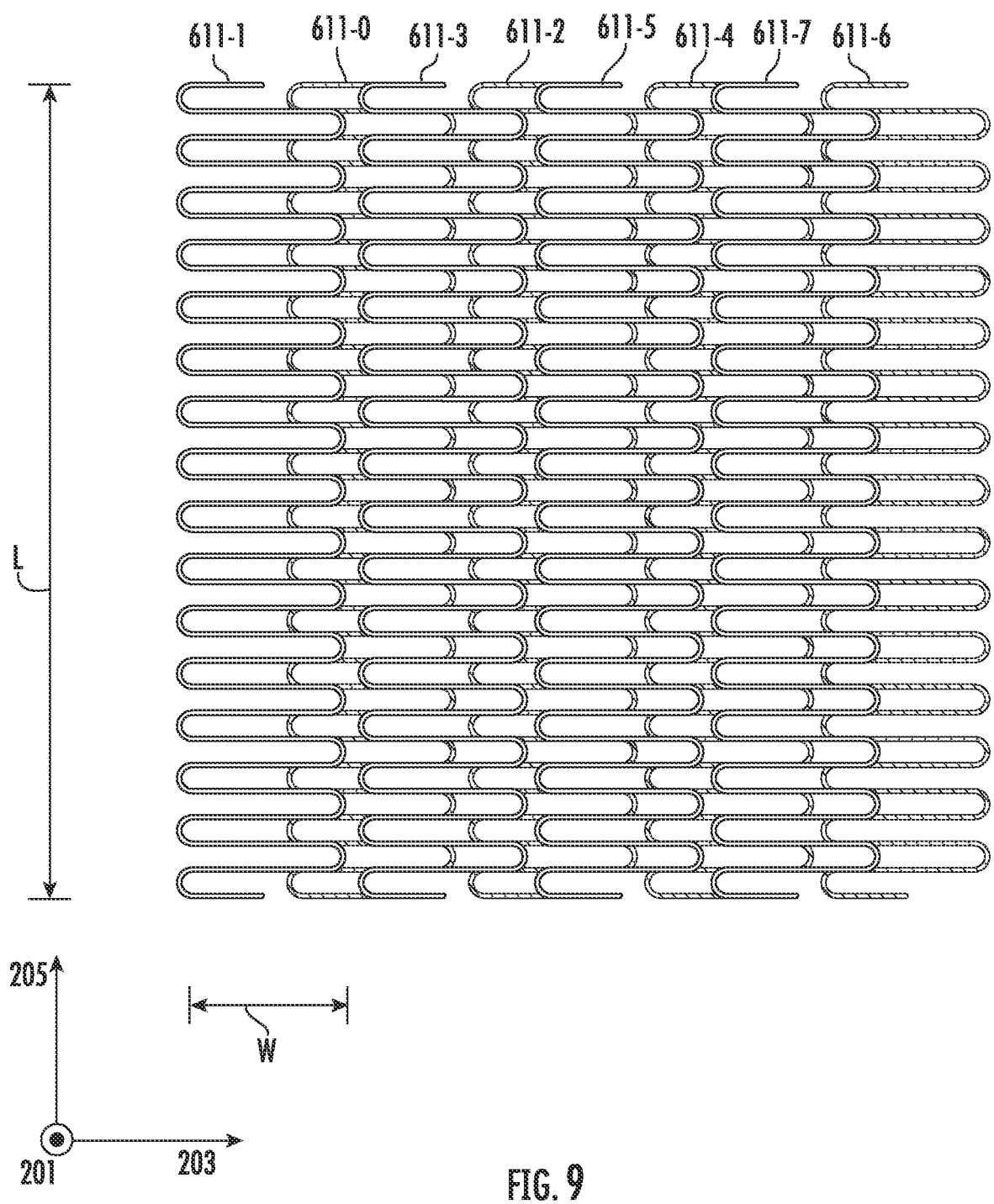
FIG. 9 is plan view of the example touch sensor depicted in FIG. 8 in accordance with example embodiments of the present disclosure.

FIGS. 8 and 9 depict an example of sensing elements formed from conductive threads formed at multiple surfaces of a touch sensor in accordance with example embodiments of the present disclosure. FIG. 8 is a perspective view depicting a simplified structure with two sensing elements 611-0 and 611-1 so as not to obscure details. FIG. 9 is a top view depicting a plurality of sensing elements including sensing elements 611-0 and 611-1 and additional sensing elements that form a touch sensor. Although conductive threads are depicted as forming the sensing elements, any type of conductive sensing element can be used, such as conductive fiber, fiber optic filaments, flexible metal lines, or other conductive line, etc. Conductive threads can be woven or otherwise integrated with a plurality of non-conductive threads to form an interactive textile. The conductive threads can be formed on opposite sides of a flexible substrate to form a first subset of conductive sensing elements 611-1, 611-3, 611-5, and 611-7 woven with or otherwise coupled to an upper first surface of the interactive textile and a second subset of conductive sensing elements 611-0, 611-2, 611-4, and 611-6 woven with or otherwise coupled to a lower second surface of the interactive textile.

Each conductive thread forms a sensing element having a width W in lateral direction 203, and a length L in longitudinal direction 201. Each conductive thread has a thread profile (e.g., an undulating thread profile similar to a sine wave) having thread peaks in the lateral direction that define the longitudinal edges of each sensing element extending in the longitudinal direction 201. Each sensing element has a length L defined by the starting and end points of the conductive thread. The width of each sensing element can be defined by the thread profile, particularly by the distance in the lateral direction 203 between two adjacent thread peaks. While the thread has an undulating thread profile, a sensing element is defined with a continuous length extending in the longitudinal direction and a continuous width that extends in the lateral direction.

In the example of FIG. 9, the first subset of sensing elements are elongated in the longitudinal direction 201 with a spacing between sensing elements that are adjacent in the lateral direction. Similarly, the second subset of sensing elements are elongated in the longitudinal direction 201 with a spacing between sensing elements that are adjacent in the lateral direction. The first subset of sensing elements is separated in the vertical direction 205 from the second subset of sensing elements. The first subset of sensing elements includes conductive threads that form a non-crossing sensing line pattern. In FIG. 9, the conductive line pattern is a parallel line pattern. The non-crossing sensing elements of the first subset form a non-crossing sensing line pattern without intersecting or crossing underneath or over one another such that each sensing element has a same or similar starting point in the first direction and a same or similar ending point in the first direction. Similarly, the non-crossing sensing lines of the second subset can form a non-crossing sensing line pattern without intersecting or crossing underneath or over one another such that each conductive line has a same or similar starting point in the first direction and a same or similar ending point in the first direction. Each sensing element includes a length (L) that extends in the longitudinal direction between a starting point and an ending point. The first subset of sensing elements are non-crossing conductive lines that have the same or similar starting points in the longitudinal direction. The thread of each sensing element of the first subset extends between the respective starting and ending points without intersecting or crossing underneath or over another thread of the first subset. The thread of each sensing element of the second subset extends between the respective starting and ending points without intersecting or crossing underneath or over another thread of the second subset.

The non-crossing sensing elements of the first subset of non-crossing sensing elements partially overlap the non-crossing sensing elements of the second subset. The non-crossing sensing elements of the entire set of sensing elements can form a sequence that alternates between sensing elements of the first subset and sensing elements of the second subset without a spacing provided between sequential sensing elements that are adjacent in the lateral direction. In this manner, each non-crossing sensing element of the first subset overlaps at least a portion of a non-crossing sensing element of the second subset that is adjacent in the lateral direction. For example, sensing element 611-3 of the first subset partially overlaps sensing elements 611-0 and 611-2 of the second subset in the lateral direction without intersecting or crossing underneath or over the sensing elements of second subset.

In the example of FIG. 9, sensing elements of the first subset are formed with a space between sensing elements adjacent in the lateral direction. Similarly, sensing elements of the second subset are formed with a space between sensing elements adjacent in the lateral direction. In other examples, the adjacent sensing elements at a particular surface may be formed without a spacing therebetween in the lateral direction. For example, sensing element 611-1, and 611-3 may be formed without a spacing in lateral direction 203. For instance, the right longitudinal edge of sensing element 611-1 may align in the lateral direction with the left longitudinal edge of sensing element 611-3. In yet another example, the right longitudinal edge of sensing element 611-1 may overlap in the lateral direction the left longitudinal edge of sensing element 611-3.

Additionally, the example of FIG. 9 shows an arrangement where adjacent conductive threads have identical profiles. For example, the thread of sensing element 611-1 and the thread of sensing element 611-3 have the same thread profile in the lateral and longitudinal directions. Each conductive thread can have the same thread profile as an adjacent conductive thread. In other examples, the set of conductive threads can include conductive threads having a mirror-image pattern of an adjacent conductive thread. For instance, the set of conductive threads can include pairs of conductive threads. Each pair of conductive threads can include a first conductive thread with its first wave peak along a first side of the width and a second conductive thread with its first wave peak along a second side of the width that is opposite of the first side of the width. The configuration forms a mirror pattern among the first conductive thread and the second conductive thread of each pair. In another embodiment, the set of conductive threads can include conductive threads having a mirror-image pattern of an adjacent conductive thread and overlapping the adjacent conductive thread in the lateral direction. For example, the conductive threads of the first subset can include pairs of first and second conductive threads having a mirror thread profile in which the first and second conductive threads overlap each other. According to such examples, each pair of conductive threads can overlap one or more pairs adjacent in the second direction.

Figure 10:
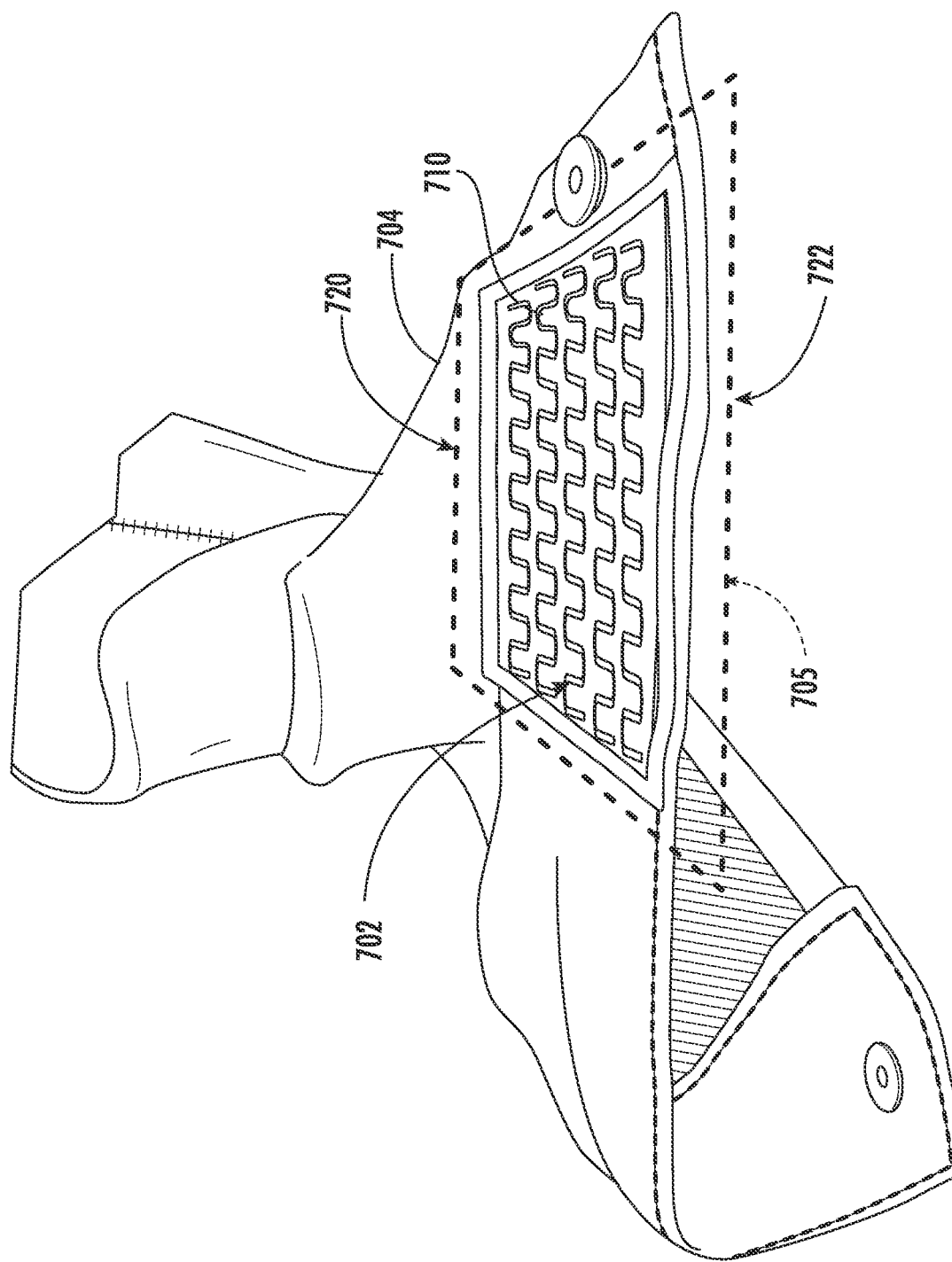
FIG. 10 depicts an example of a touch sensor integrated with an interactive object in accordance with example embodiments of the present disclosure.

FIG. 10 is a perspective view of an example of an interactive object including a capacitive touch sensor 302 in accordance with example embodiments of the present disclosure. In this example, the interactive object is an interactive garment 304 having a capacitive touch sensor 302 integrated in the cuff of a sleeve. By way of example, the user can perform a gesture by brushing in on the cuff of the interactive object 104 cuff where the capacitive touch sensor 302 is placed. Gesture manager 161 can be configured to initiate and/or implement one or more functionalities in response to the brush in gesture. For example, a user may perform a brush in gesture in order to receive a notification related to an application at the remote computing device (e.g., having a text message converted into an audible output at the remote computing device). Note that any type of touch, tap, swipe, hold, or stroke gesture may be recognized by capacitive touch sensor 302. In an alternate example, a resistive touch sensor may be used rather than capacitive touch sensor.

The conductive sensing elements 310 in FIG. 10 are positioned at a touch sensor area 305. The sensing elements 310 can be partitioned into subsets of sensing elements to enable a sensor system to distinguish between touch inputs at an intended touch input surface 320 and touch inputs at an unintended second surface 322. The second surface can be positioned toward a user's body when the interactive garment is worn. In traditional designs, it may be difficult to distinguish a touch between the intended touch input surface 320 and the unintended second surface 322. Typically, thick padding is provided between the user's body and the touch sensor to attenuate the capacitive signal generated in response to the user's body at the unintended second surface 322.

In accordance with example embodiments, the first subset of conductive sensing elements can be coupled to a first side of a flexible substrate and the second subset of conductive sensing elements can be coupled to a second side of the flexible substrate. The first side can be positioned closer to the intended touch input surface 320 and the second side can be positioned further from the intended touch input surface 320 and closer to the second surface 322 which will be adjacent to the user when worn. For example, the first side can be adjacent to the intended touch input surface and the second side can be adjacent to one or more portions of the user's body when the interactive garment is worn by the user. In some embodiments, the first side of the flexible substrate and the second side of the flexible substrate can be separated in the direction orthogonal to the first side and the second side of the flexible substrate. By positioning subsets of sensing elements on opposite sides of the substrate, the capacitive signal generated by the user's body at the second surface can be distinguished from the capacitive signal generated by the touch input at the intended touch input surface.

In accordance with example embodiments, the first and second subsets of sensing elements can be separated in a vertical direction to provide signal differentiation to distinguish inputs provided at the intended input surface from inputs provided at the unintended second surface. For example, the sensing elements can be arranged as non-crossing sensing lines as shown in FIG. 10. The sensing lines can be elongated in a first direction with a separation therebetween in a second direction orthogonal to the first direction. A first subset of the non-crossing sensing lines and a second subset of the non-crossing sensing lines can be separated in a direction orthogonal to the first direction and the second direction. Notably, this separation can be provided with or without of the use of a flexible substrate to which the lines are coupled. A touch input provided at the intended touch input surface (e.g., +vertical axis 205) can generate a stronger signal (e.g., capacitance) on the first subset of lines than the second subset of lines. A touch input provided at the unintended second surface (e.g., −vertical axis) can generate a stronger signal (e.g., capacitance) on the second subset of lines than the first subset of lines.

Figure 11:
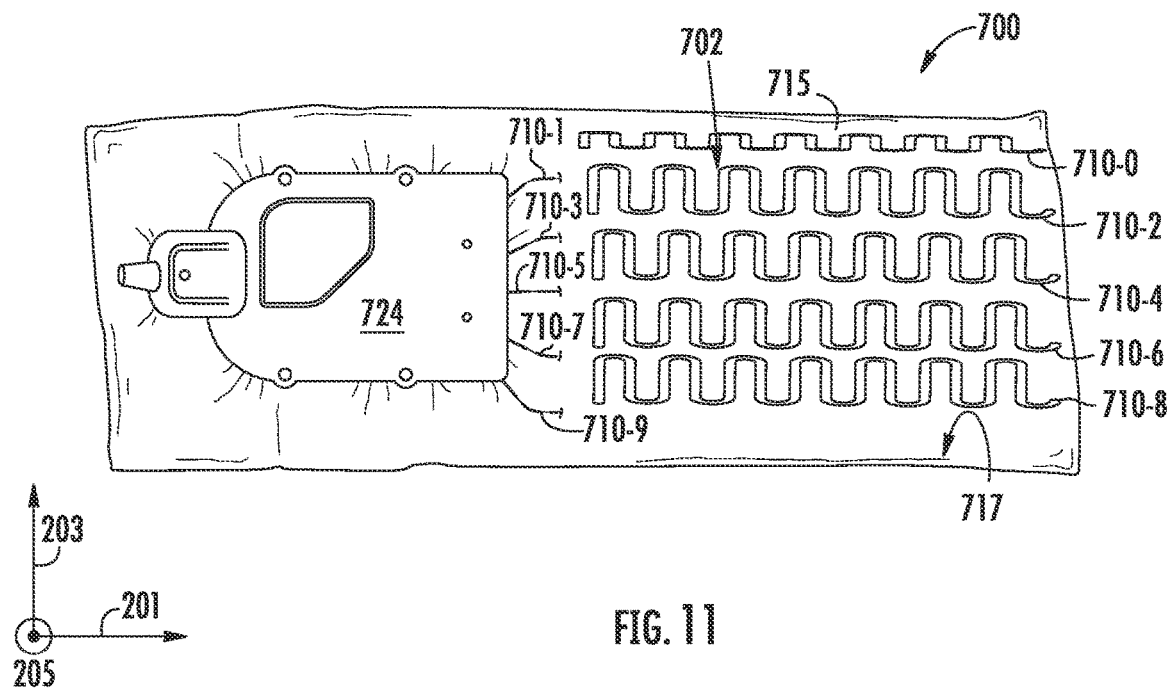
FIGS. 11 and 12 are top and bottom views, respectively, depicting an example of a touch sensor including individual subsets of conductive threads coupled to opposite sides of a flexible substrate in accordance with example embodiments of the present disclosure.
Figure 12:
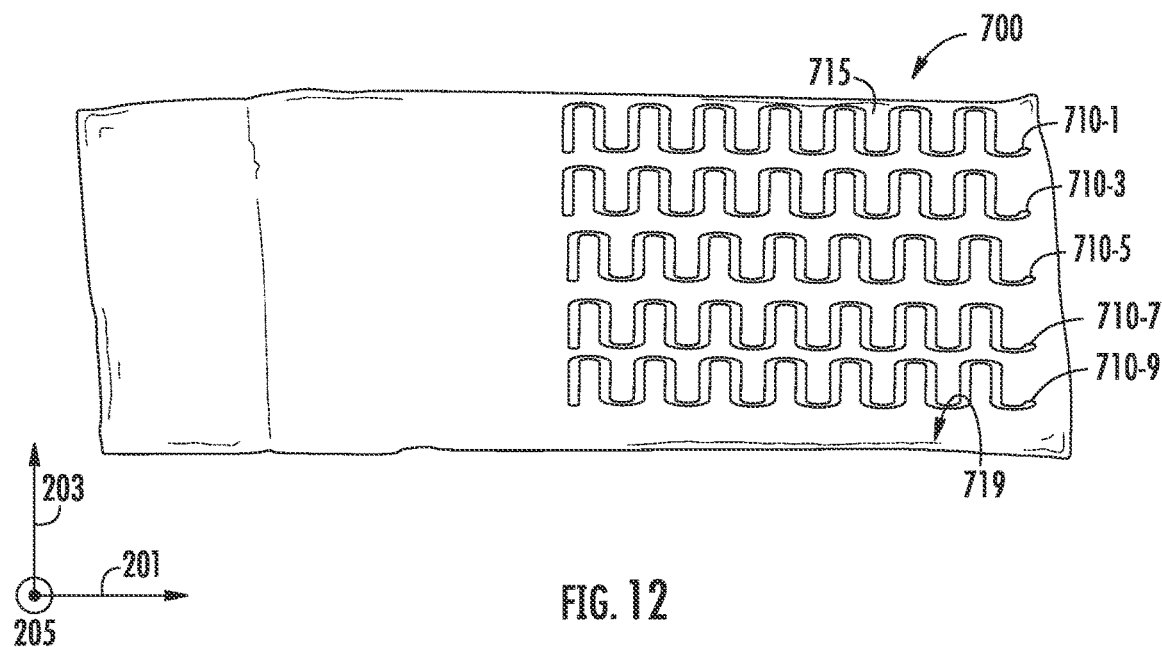

FIG. 11 and FIG. 12 are top and bottom views, respectively, depicting an example of a touch sensor including individual subsets of sensing lines coupled to opposite sides of a flexible substrate in accordance with example embodiments of the present disclosure. A sensor assembly 700 includes a touch sensor 702 and an internal electronics module 724. Internal electronics module 724 is one example of an internal electronics module 124 as depicted in FIG. 2. Touch sensor 702 is one example of a touch sensor 102 as illustrated in FIGS. 1 and 2, and can be configured as a capacitive touch sensor in example embodiments.

Touch sensor 702 is formed from a plurality of conductive threads 710-0 to 710-9. Conductive threads 710-0 to 710-9 are one example of sensing elements 110. Conductive threads 710-0 to 710-9 form non-crossing sensing lines coupled to a substrate in a longitudinal direction to receive touch input. Internal electronics module 724 may include sensing circuitry (not shown) in electrical communication with the plurality of conductive threads 710-0 to 710-9. Internal electronics module 724 may include one or more communication ports that can couple to a communications cable to provide communication with a removable electronics module.

The set of conductive threads 710 can be woven or otherwise integrated with a plurality of non-conductive threads to form an interactive textile substrate 715. More particularly, the conductive threads 710 can be formed on opposite sides of substrate 715. A first subset of conductive threads 710-1, 710-3, 710-5, 710-7, and 710-9 can be woven with or otherwise coupled to the first side 719 of the interactive textile and the second subset of conductive threads 710-0, 710-2, 710-4, 710-6, and 710-8 can be woven with or otherwise coupled to the second side 717 of the interactive textile. The first subset of conductive threads can be formed on the first side 719 adjacent to a first surface of the touch sensor and the second subset of conductive threads can be formed on the opposite side 617 adjacent to a second surface of the touch sensor. A touch input to the touch sensor can be detected by the plurality of conductive threads using sensing circuitry of internal electronics module 724 connected to the one or more conductive threads. The sensing circuitry can generate touch data (e.g., raw sensor data or data derived from the raw sensor data) based on the touch input. The sensing circuitry and/or other control circuitry (e.g., a local or remote processor) can analyze the touch data to determine a surface of the touch sensor associated with the touch input. In some examples, the control circuitry can ignore touch inputs associated with the second surface, while analyzing touch inputs associated with the first surface to detect one or more predetermined gestures. As another example, the control circuitry can analyze touch inputs associated with the first surface for a first set of predetermined gestures and can analyze touch inputs associated with the second surface for a second set of predetermined gestures.

Conductive threads 710-0 to 710-9 can be formed on or within the textile-based substrate 715. By way of example, textile-based substrate 715 may be formed by weaving, embroidering, stitching, or otherwise integrating conductive threads 710-0 to 710-9 with a set of nonconductive threads.

The conductive threads can be coupled to a connecting ribbon in some examples, which can be utilized to position the conductive lines for connection to a plurality of electrical contact pads (not shown) of internal electronics module 724. The plurality of conductive threads 710-0 to 710-9 can be collected and organized using a ribbon with a pitch that matches a corresponding pitch of connection points of an electronic component such as a component of internal electronics module 724. It is noted, however, that a connecting ribbon is not required.

A sensor system in accordance with example embodiments can include a touch sensor and one or more control circuits that are configured to selectively detect input gestures at the touch sensor based on a surface at which the touch inputs are received. The one or more control circuits can include sensing circuitry configured to detect touch inputs to the touch sensor using the one or more sensing elements. The sensing circuitry can generate sensor data based on the touch inputs. The one or more control circuits can additionally or alternatively include one or more processors local to an interactive object and/or one or more processors remote from the interactive object, such as at one or more remote computing devices. The one or more control circuits can implement all or a portion of a gesture manager in example embodiments.

Figure 13:
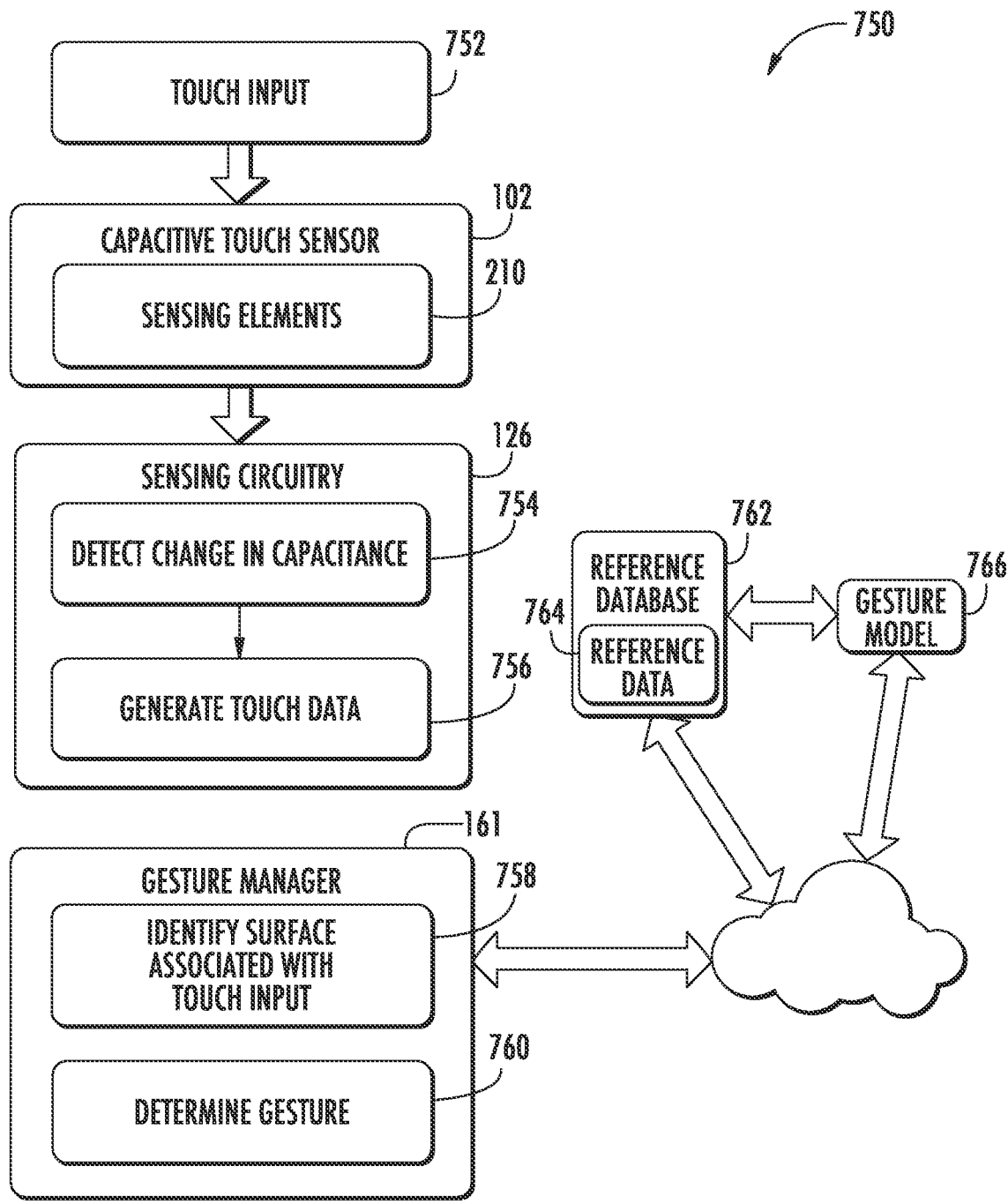
FIG. 13 is a block diagram depicting an example computing environment, illustrating the detection of gestures based on an identified input surface of the touch sensor in accordance with example embodiments of the present disclosure.

FIG. 13 is a block diagram depicting an example computing environment 750, illustrating the detection of gestures based on an identified input surface of a touch sensor in accordance with example embodiments of the present disclosure.

Interactive object 104 and/or one or more computing devices in communication with interactive object 104 can detect a user gesture based at least in part on capacitive touch sensor 102. For example, interactive object 104 and/or the one or more computing devices can implement a gesture manager 161 that can identify one or more gestures in response to touch input 752 to the capacitive touch sensor 102.

Interactive object 104 can detect touch input 752 to capacitive touch sensor 102 based on a change in capacitance associated with a set of conductive sensing elements. For example, a user can move an object (e.g., finger, conductive stylus, etc.) proximate to or touch capacitive touch sensor 102, causing a response by the individual sensing elements. By way of example, the capacitance associated with each sensing element can change when an object touches or comes in proximity to the sensing element. As shown at (754), sensing circuitry 126 can detect a change in capacitance associated with one or more of the sensing elements. Sensing circuitry 126 can generate touch data at (756) that is indicative of the response (e.g., change in capacitance) of the sensing elements to the touch input. The touch data can include one or more touch input features associated with touch input 752. In some examples, the touch data may identify a particular element, and an associated response such as a change in capacitance. In some examples, the touch data may indicate a time associated with an element response.

Gesture manager 161 can analyze the touch data to identify the one or more touch input features associated with touch input 752. Gesture manager 161 can be implemented at interactive object 104 (e.g., by one or more processors of internal electronics module 124 and/or removable electronics module 206) and/or one or more computing devices remote from the interactive object 104.

Gesture manager 161 can analyze the touch data at (758) to identify a surface associated with the touch input. By way of example, gesture manager 161 can determine at least one signal difference associated with a first subset of conductive sensing elements adjacent an intended touch input surface and a second subset of conductive sensing element adjacent to at least one second surface. If the signal difference indicates a larger response by the first subset of sensing elements, gesture manager 161 can classify the touch input as associated with the intended touch input surface. If, however, the signal difference indicates a larger response by the second subset of sensing element, gesture manager 161 can classify the touch input is associated with the at least one second surface.

In accordance with some implementations, the one or more control circuits can analyze a respective response such as a capacitance of each sensing element of the touch sensor to determine whether a touch input is associated with a first surface of the touch sensor or a second surface of the touch sensor. For instance, the control circuits can determine whether at least one capacitance of the first subset of sensing elements is greater than at least one capacitance of the second subset of sensing elements. The at least one capacitance of each subset can include a capacitance associated with individual sensing elements of each subset, an average capacitance associated with each subset, and/or an accumulated capacitance associated with each subset in various implementations.

At (760), gesture manager 161 can determine a gesture based at least in part on the touch data. In some examples, gesture manager 161 determines whether the touch data corresponds to a particular gesture only if the touch input is associated with an intended touch input surface. For example, gesture manager 161 may disregard or otherwise ignore touch data associated with an unintended input surface. As described herein, in other examples gesture manager 161 may identify a particular gesture based on the surface of which the touch input is received. For example, a first gesture may be identified in response to a touch input at a first surface while a second gesture may be identified in response to a touch input at a second surface.

In some examples, gesture manager 161 can identify at least one gesture based on reference data 764. Reference data 764 can include data indicative of one or more pre-defined parameters associated with a particular input gesture. The reference data 764 can be stored in a reference database 762 in association with data indicative of one or more gestures. Reference database 762 can be stored at interactive object 104 (e.g., internal electronics module 124 and/or removable electronics module 206) and/or at one or more remote computing devices in communication with the interactive object 104. In such a case, interactive object 104 can access reference database 762 via one or more communication interfaces (e.g., network interface 216).

Gesture manager 161 can compare the touch data indicative of the touch input 752 with reference data 764 corresponding to at least one gesture. For example, gesture manager 161 can compare touch input features associated with touch input 752 to reference data 764 indicative of one or more pre-defined parameters associated with a gesture. Gesture manager 161 can determine a correspondence between at least one touch input feature and at least one parameter. Gesture manager can detect a correspondence between touch input 752 and at least one line gesture identified in reference database 762 based on the determined correspondence between at least one touch input feature and at least one parameter. For example, a similarity between the touch input 752 and a respective gesture can be determined based on a correspondence of touch input features and gesture parameters.

In some examples, gesture manager 161 can input touch data into one or more machine learned gesture models 766. A machine-learned gesture model 766 can be configured to output a detection of at least one gesture based on touch data and/or an identification of a surface or subset of sensing element associated with a touch input. Machine learned gesture model 766 can generate an output including data indicative of a gesture detection. For example, machine learned gesture model 766 can be trained, via one or more machine learning techniques, using training data to detect particular gestures based on touch data. Similarly, a machine learned gesture model 766 can be trained, via one or more machine learning techniques, using training data to detect a surface associated with a touch input.

Gesture manager 161 can input touch data indicative of touch input 752 and/or into machine learned gesture model 766. One or more gesture models 766 can be configured to determine whether the touch input is associated with a first subset of sensing elements or a second subset of sensing elements. Additionally or alternatively, one or more gesture models 766 can be configured to generate one or more outputs indicative of whether the touch data corresponds to one or more input gestures. Gesture model 766 can output data indicative of a particular gesture associated with the touch data. Additionally, or alternatively, gesture model can output data addictive of a surface associated with the touch data. Gesture model 766 can be configured to output data indicative of an inference or detection of a respective gesture based on a similarity between touch data indicative of touch input 752 and one or more parameters associated with the gesture.

In accordance with examples embodiments, a sensor system can selectively determine whether a touch input corresponds to a particular input gesture based at least in part on whether the touch input is determined to have been received at first surface of the touch sensor or a second surface of the touch sensor. In response to determining that the touch input is associated with the first surface, the sensor system can determine whether the touch data corresponds to one or more gestures or other predetermined movements. For example, the sensor system can compare the touch data with reference data representing one or more predefined parameters to determine if the touch data corresponds to one or more gestures. In response to detecting the first input gesture, the sensor system can initiate a functionality at a computing device. In response to determining that the touch input is associated with the second surface, however, the sensor system can automatically determine that the touch input is not indicative of the particular input gesture such that a functionality is not initiated.

In some implementations, a touch input at a first surface of the touch sensor can be associated with a first input gesture while the same or a similar touch input at a second surface of the touch sensor can be associated with a second input gesture. For example, the sensor system can determine whether touch data generated in response to a touch input is associated with the first surface of the touch sensor or the second surface of the touch sensor. Additionally, the sensor system can determine whether the touch data corresponds to one or more predefined parameters. If the touch data corresponds to the one or more predefined parameters and is associated with the first surface, the sensor system can determine that a first input gesture has been performed. If, however, the touch data corresponds to the one or more predefined parameters and is associated with the second surface, the sensor system can determine that a second input gesture has been performed. By differentiating the surface at which an input is received, the sensor system can detect a larger number of input gestures in example embodiments.

Interactive object 104 and/or a remote computing device in communication with interactive object 104 can initiate one or more actions based on a detected gesture. For example, the detected gesture can be associated with a navigation command (e.g., scrolling up/down/side, flipping a page, etc.) in one or more user interfaces coupled to interactive object 104 (e.g., via the capacitive touch sensor 102, the controller, or both) and/or any of the one or more remote computing devices. In addition, or alternatively, the respective gesture can initiate one or more predefined actions utilizing one or more computing devices, such as, for example, dialing a number, sending a text message, playing a sound recording etc.

Figure 14:
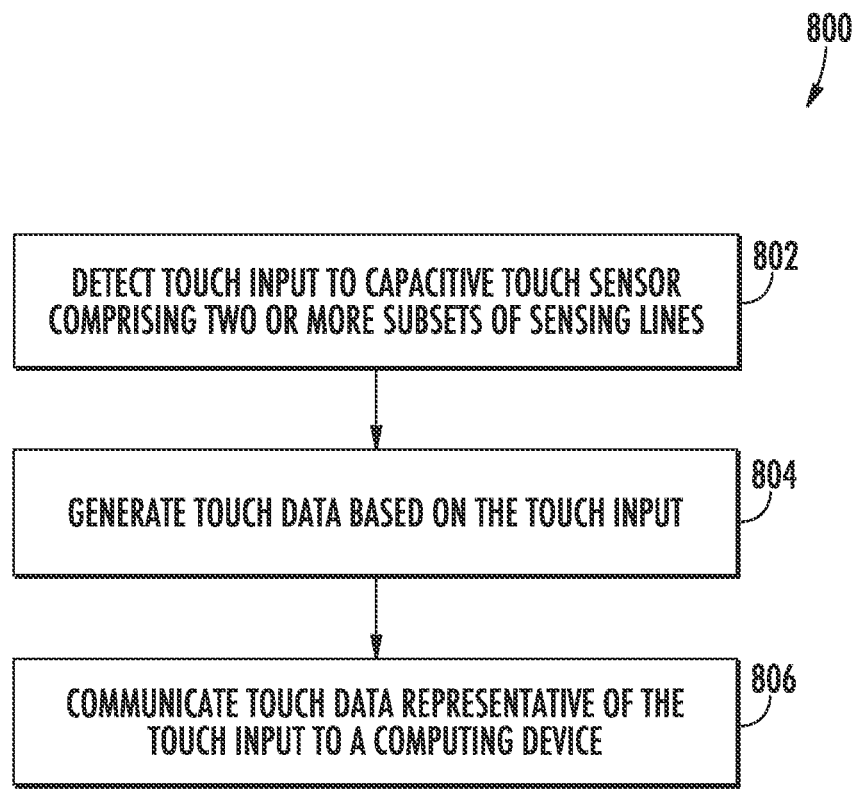
FIG. 14 is a flowchart depicting an example process of generating touch data in response to touch input detected by a touch sensor in accordance with example embodiments of the present disclosure.
Figure 18:
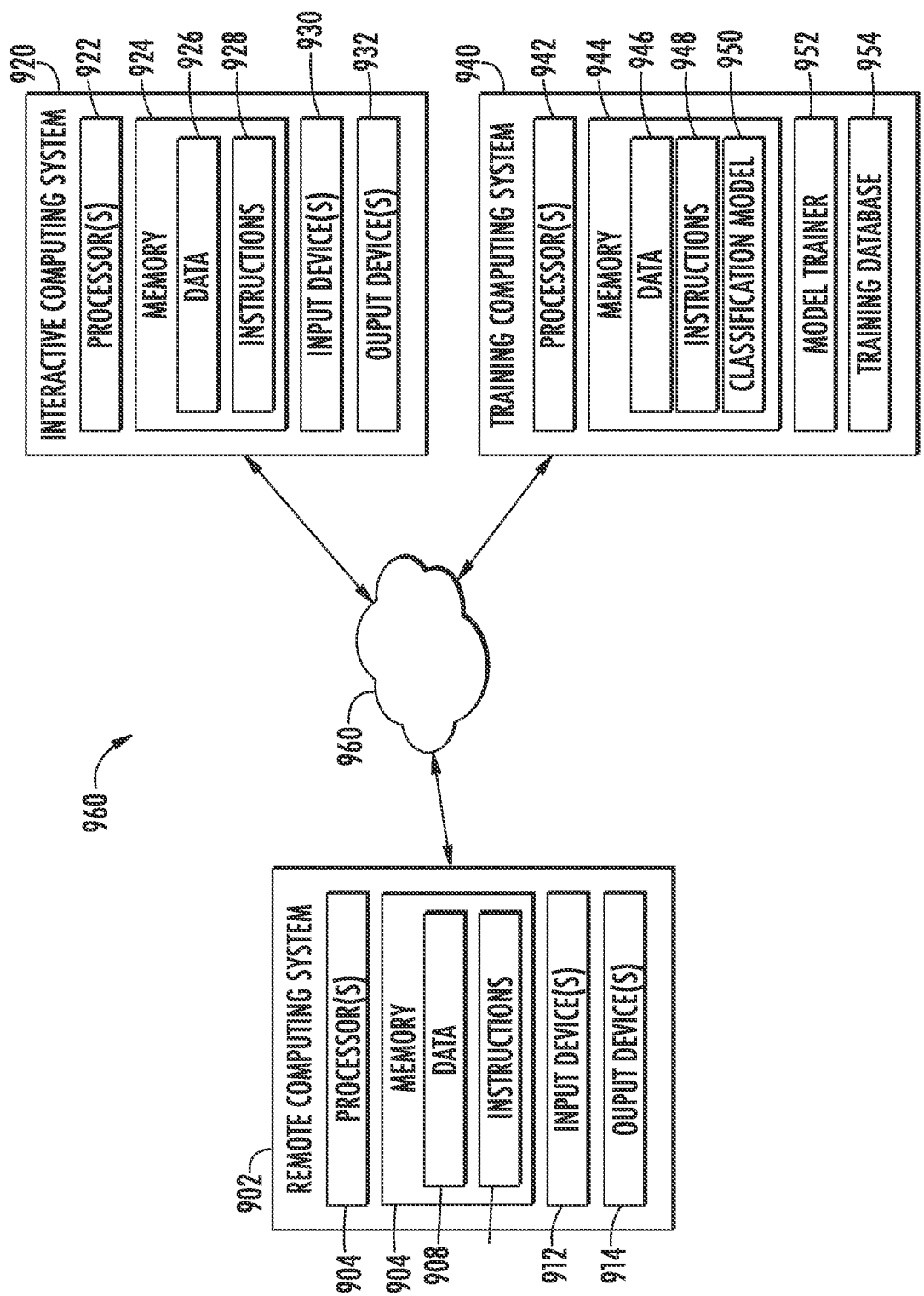
FIG. 18 depicts a block diagram of an example computing system that can be used to implement example embodiments in accordance with the present disclosure.

FIG. 14 illustrates an example method 800 of generating touch data using an interactive object. This method and other methods herein are shown as sets of blocks that specify operations performed but are not necessarily limited to the order or combinations shown for performing the operations by the respective blocks. One or more portions of method 800, and the other processes described herein can be implemented by one or more computing devices such as, for example, one or more computing devices of a computing environment 100 as illustrated in FIG. 1, computing system 190 as illustrated in FIG. 2, computing system 200 as illustrated in FIG. 3, or a computing environment 900 as illustrated in FIG. 18. While in portions of the following discussion reference may be made to a particular computing environment, reference to which is made for example only. The techniques are not limited to performance by one entity or multiple entities operating on one device. One or more portions of these processes can be implemented as an algorithm on the hardware components of the devices described herein.

At 802, method 800 can include detecting a touch input to an interactive object. Block 802 may include detecting touch-input to a set of sensing elements such as conductive threads woven into an interactive textile or otherwise attached to a flexible substrate. The set of sensing elements can include a first subset of sensing elements that are separated vertically from a second subset of sensing elements. Additionally or alternatively, the first subset of sensing elements can be coupled to a first side of a flexible substrate and the second subset sensing elements can be coupled to a second side of the flexible substrate. By way of example, sensing circuitry 126 (FIG. 2) can detect touch-input to a set of sensing elements 110 forming a touch sensor 102 (FIG. 1) when an object, such as a user's finger, touches or is proximate to touch sensor 102.

At 804, touch data is generated based on the touch-input. For example, sensing circuitry 126 can generate touch data including sensor data or data based on sensor data in response to the touch-input. The touch data may include respective signal values (e.g., capacitance) associated with the set of sensing elements 110. To detect the touch-input and/or a position of the touch input, sensing circuitry 126 can use self-capacitance sensing or other techniques.

At 806, the touch data is communicated to a computing device to control the computing device or one or more applications at the computing device. For example, communication interface 162 at object 104 can communicate the touch data generated by sensing circuitry 126 to gesture manager 161 implemented at removable electronics module 150. Gesture manager 161 may be implemented at object 104, in which case communication interface 162 may communicate the touch data to gesture manager 161 via a wired connection. Additionally or alternatively, gesture manager 161 may be implemented remote from object 104, in which case network interface 156 may communicate the touch data to gesture manager 161 via network 108. It is noted that the movement data such as touch data may include various types of data. For example, the movement data may include raw sensor data in some examples. In other examples, the touch data may include data indicative of a motion, gesture, or intermediate representation of the sensor data as has been determined by the object (e.g., by microprocessor 128 and/or microprocessor 152).

Figure 15:
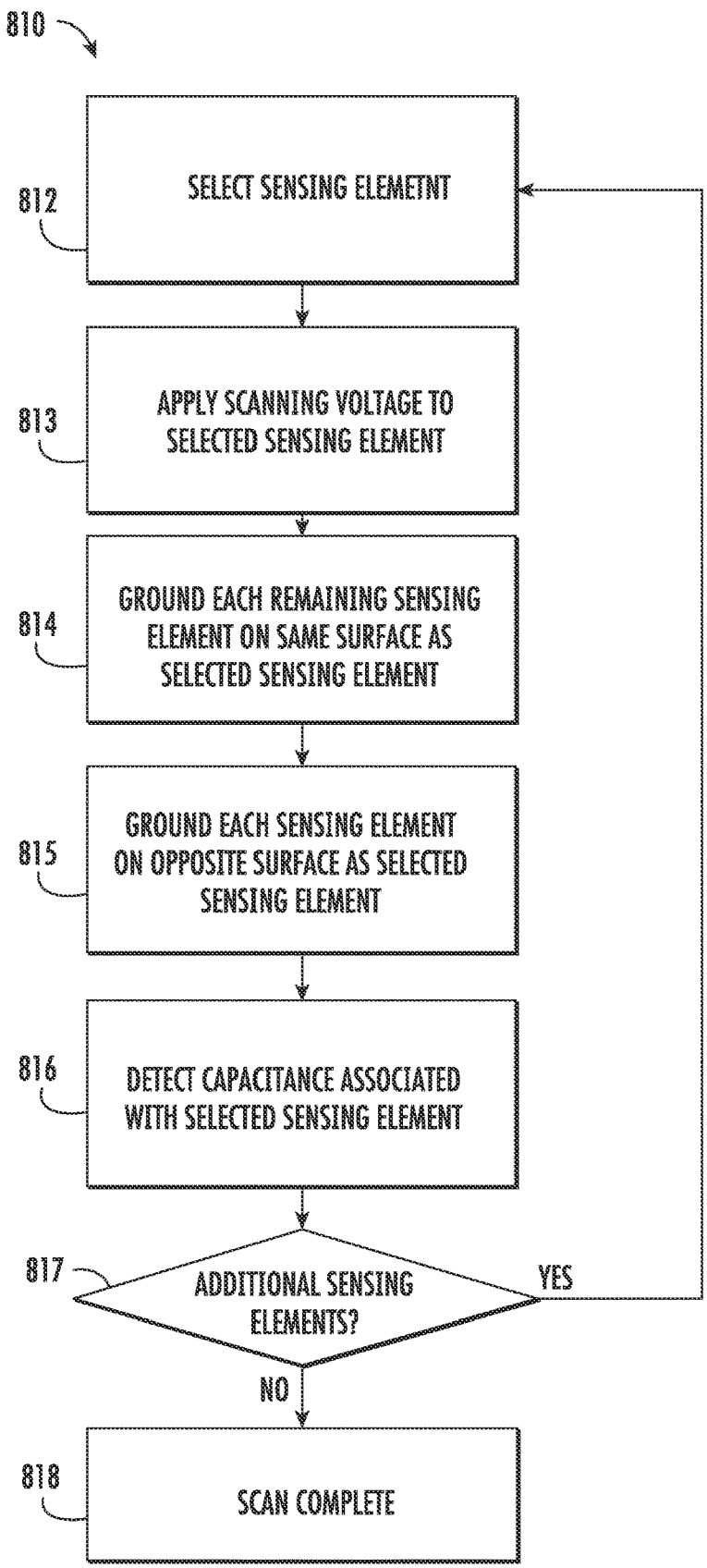
FIG. 15 is a flowchart depicting an example process of scanning a selected sensing element to detect a touch-input response in accordance with example embodiments of the present disclosure.

FIG. 15 depicts an example method 810 of scanning a set of sensing elements to detect a touch input by determining capacitances associated with the sensing elements. Method 810 can be performed by one or more control circuits in example embodiments.

At 812, method 810 includes selecting a sensing element to be scanned. At 813, method 808 includes applying a scanning voltage to the selected sensing element. For instance, the one or more control circuits can apply a control signal (e.g., a sine signal) such as an AC scanning voltage to a first sensing element at a first surface.

At 814, method 810 includes grounding or applying a suitable voltage less than the scanning voltage to the remaining sensing elements at the selected surface. At (815), method 808 includes grounding or applying a low voltage to the sensing elements at the non-selected surface opposite the selected surface.

At 816, method 810 includes detecting a capacitance associated with the selected sensing element. For instance, when configured as a self-capacitance sensor, sensing circuitry can charge a selected conductive thread by applying the scanning voltage while grounding or applying a low-level voltage to the other conductive threads. When an object, such as the user's finger, touches a conductive thread, the capacitive coupling between the conductive thread that is being scanned and system ground may be increased, which changes (e.g., increases) the capacitance sensed by the touched conductive thread.

At 817, method 810 includes determining whether there are additional sensing elements to scan. If there are additional sensing elements to scan, method 810 proceeds at 812 where an additional sensing element is selected. If there are no additional sensing elements to scan, method 810 completes at 818.

Figure 16:
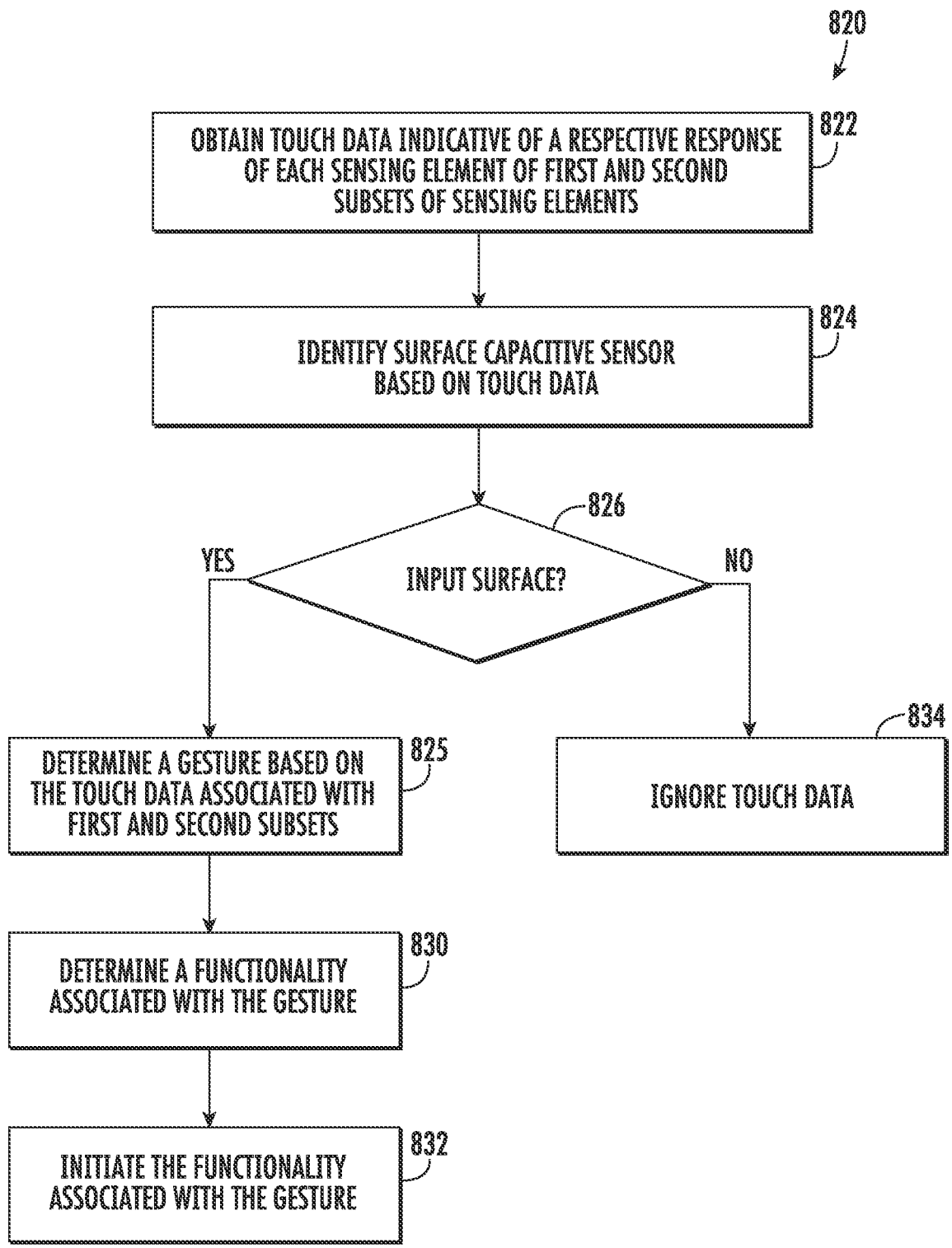
FIG. 16 is a flowchart depicting an example process of selectively identifying a gesture and initiating a functionality based on an identified input surface of a touch sensor in accordance with example embodiments of the present disclosure.

FIG. 16 illustrates an example method 820 of determining predefined motions such as gestures usable to control a computing device or applications at the computing device based on touch data received from an interactive object. Method 820 includes initiating a functionality that is triggered by user interaction with an interactive object. The computing device may be local to the interactive object, such as incorporated within a garment or object, or may be remote to the interactive object, such as a smartphone or a remote computing device such as a server.

At 822, method 820 includes obtaining touch data indicative of a respective response of each sensing element of a first and second subset of sensing elements. For example, a network interface at a computing device 106 can receive touch data from network interface 216 at interactive object 104 that is communicated to gesture manager 161 in one example. If gesture manager 161 is implemented at the interactive object, the movement data may be received by an internal electronics module or removable electronics module of the interactive object.

At 824, method 820 can include identifying the surface of the touch sensor based on the touch data. By way of example, gesture manager 161 can determine at least a first respective response by a first conductive sensing element of the first subset and a second respective response by a second conductive sensing element of the second subset. The gesture manager can determine whether the touch input is associated with a first surface of the touch sensor or a second surface of the touch sensor based at least in part on the first respective response and the second respective response. In some examples, an accumulated signal difference associated with the first subset of sensing element an accumulated signal difference associated with a second subset of sensing element can be used to determine a surface of the touch sensor associated with touch input. In some examples, one or more machine-learned models can be configured to determine whether a touch input is associated with an intended input surface or a second surface of a touch sensor. Touch data can be provided as one or more inputs to the machine-learned model which can provides as one or more outputs an indication of particular input surface and/or subset of sensing elements based on the touch data.

At 826, method 820 can include determining whether the surface associated with the touch input is intended input surface of the touch sensor. For example, gesture manager 161 can determine whether the touch input is associated with a first subset of conductive sensing elements or a second subset of conductive sensing elements. The first subset of conductive sensing elements may be adjacent to the intended input surface, and the second subset of conductive sensing elements may be adjacent to one or more second surfaces of the touch sensor. If the touch input is associated with the intended input surface of the touch sensor, method 820 proceeds at 828.

At 825, method 820 can include determining whether the touch data is indicative of a predetermined motion such as a gesture. For example, gesture manager 161 can identity a predefined motion such as a gesture based on the touch data, such as single-finger touch gesture, a double-tap gesture, a two-finger touch gesture, a swipe gesture, and so forth. In some embodiments, gesture manager 161 can determine whether the touch data corresponds to one or more predefined parameters associated with the first input gesture. It is noted that the response of sensing elements from the first subset of sensing element adjacent to the intended input surface as well as the response of sensing elements adjacent to the user's body can be used in determining a gesture at 825. That is, while a particular subset of sensing elements may be associated with a touch input in order to identify particular surface of the touch sensor, the entire set of sensing elements can be used to detect gestures.

Various techniques can be used to detect gestures in accordance with example embodiments of the present disclosure. The sensor system can determine whether touch data corresponds to one or more predefined parameters associated with a particular input gesture in some examples. The interactive object and/or a computing device in communication with the interactive object can detect a correspondence between a touch input and at least one gesture. For example, one or more features of the touch data that correspond to one or more of the predefined parameter(s) for at least one gesture can be identified. By way of example, a correspondence between features and parameters can be identified using matching criteria. A similarity between touch data and a respective gesture can be determined. For example, the similarity between the touch input and the respective gesture can be determined based on a number of corresponding features and parameters. In some examples, a correspondence between the touch data and a respective gesture can be detected based on a respective gesture associated with the largest number of corresponding features and parameters.

The one or more predefined parameters can be stored in a reference database with an identification of a respective gesture in example embodiments. The sensor system can compare the touch data with the one or more predefined parameters to determine whether the particular input gesture has been performed. Examples of pre-defined parameters can include sensing, motion, or other detection parameters. Features of the touch data such as capacitance levels, line activation orders, a number of elements having a capacitance change, etc. can be compared to the pre-defined parameters in some examples. The sensor system can detect the first input gesture in response to the touch data corresponding to the predefined parameters and the touch input being associated with the first surface.

Additionally or alternatively, touch data generated by an interactive object can be input into one or more machine-learned models (e.g., a machine-learned classification model) to detect a surface at which the corresponding touch input was received, and/or to detect one or more predefined gestures. Data indicative of particular surface of the touch sensor and/or data indicative of the detection of a predetermined gesture can be generated as the output of the one or more machine-learned models.

By way of example, a machine-learned classification model can include one or more neural networks (e.g., deep neural networks, convolutional neural networks) or other multi-layer non-linear models. The model(s) can be trained, via one or more machine learning techniques, using training data. The training data can include touch data previously collected by one or more interactive objects at a first surface of a touch sensor and a second surface of a touch sensor. By way of example, one or more interactive objects can generate touch data based on one or more touch inputs associated with a user of the one or more interactive objects. The training data can be labeled to identify a particular surface and/or gesture corresponding to the movement data. The machine-learned classification model can be trained using various training or learning techniques, such as, for example, backwards propagation of errors based on the labeled training data.

In this manner, the machine-learned classification model can be trained to detect particular gestures associated with particular surfaces of a touch sensor based on touch data. In some implementations, touch data can be input into the machine-learned classification model. The machine-learned classification model can ignore touch inputs associated with an unintended surface of the touch sensor in some examples. The machine-learned classification model can generate data indicative of a particular gesture if the touch input is received at an intended input surface and if the touch data touch data matches or otherwise indicates a correspondence with the particular gesture. In other examples, the machine-learned classification model can generate data indicative of a first gesture in response to touch data that is associated with a first surface of the touch sensor and that matches or otherwise indicates a correspondence with the first gesture. The machine-learned classification model can generate data indicative of a second gesture in response to touch data that is associated with a second surface of the touch sensor and that matches or otherwise indicates a correspondence with the second gesture. In some examples, the same or similar touch data received at different surfaces can correspond to different gestures.

By way of example, the machine-learned classification model can include a machine-learned binary classifier model. The model can classify the touch data in a binary manner, such as to indicate whether the touch data is associated with a first surface of the touch sensor (e.g., "1") or whether the touch data is associated with a second surface of the touch sensor (e.g., "0"). Similarly, a machine learned classification model can include a machine learned binary classifier model that can classify touch data as indicative of a particular gesture (e.g., "1") or as not indicative of a particular gesture (e.g., "0").

In some implementations, gesture manager 161 can determine whether touch data corresponds to one or more pre-defined parameters associated with an input gesture by providing the touch data as one or more inputs to one or more machine-learned models. The machine-learned model(s) can generate one or more outputs indicative of whether the one or more inputs correspond to the first input gesture. In some examples, the one or more machine-learned models are configured to generate the one or more outputs indicative of whether the one or more outputs correspond to the first input gesture based at least in part on whether the touch input is associated with the first subset of conductive sensing elements or the second subset of conductive sensing elements.

At 830, method 820 can include determining a functionality associated with the predefined motion. In some examples, gesture manager 161 determines whether the touch data corresponds to a request to perform a particular functionality. For example, gesture manager 161 can determine whether the touch data corresponds to a user input or gesture that is mapped to a particular functionality, such as triggering an output response such as an audible output associated with a text or other message, triggering a text message, answering a phone call, creating a journal entry, and so forth. As described throughout, any type of user input or gesture may be used to trigger the functionality, such as swiping, tapping, or holding touch sensor 102. In one or more implementations, gesture manager 161 enables application developers or users to configure the types of user input or gestures that can be used to trigger various different types of functionalities.

At 832, method 820 can include initiating the functionality associated with the input gesture. For example, gesture manager 161 can cause a particular functionality to be performed, such as by obtaining data associated with an application and initiating an output response that provides an indication of the data, answering a phone call, creating a journal entry, increasing the volume on a television, turning on lights in the user's house, opening the automatic garage door of the user's house, and so forth. In this regard, the functionality can be initiated computing device it is local to the interactive object or remote from the interactive object. For example, interactive object can transmit to a remote computing device data indicative of the determined input gesture. In another example, the interactive object can initiate the functionality locally, for example by local computing device.

A functionality can be initiated at a local and/or remote computing device in response to detecting a gesture.

Returning to 826, if the touch input is not associated with the intended input surface of the touch sensor, method 820 proceeds at 834. At 834, method 820 can include determining that the touch input to the touch sensor was unintentional or should otherwise be ignored. For example, gesture manager 161 can take no action at 834 in some examples. In this manner, gesture manager 161 can automatically determine that the touch input is not indicative of an input gesture in response to determining that the touch input is associated with a second surface of the touch sensor.

Although not shown, method 820 can include determining a gesture associated with the second surface of the touch sensor and some examples. For instance, after determining that a second surface of the touch sensor is where touch input is received, gesture manager 161 can determine a gesture based on the touch data and the determination that the touch data is associated with the second surface of the touch sensor. Gesture manager can determine a particular gesture based on the identification that the touch input was not received at the intended input surface and some examples. A functionality associated with the gesture can be determined in the functionality initiated as earlier described.

Figure 17:
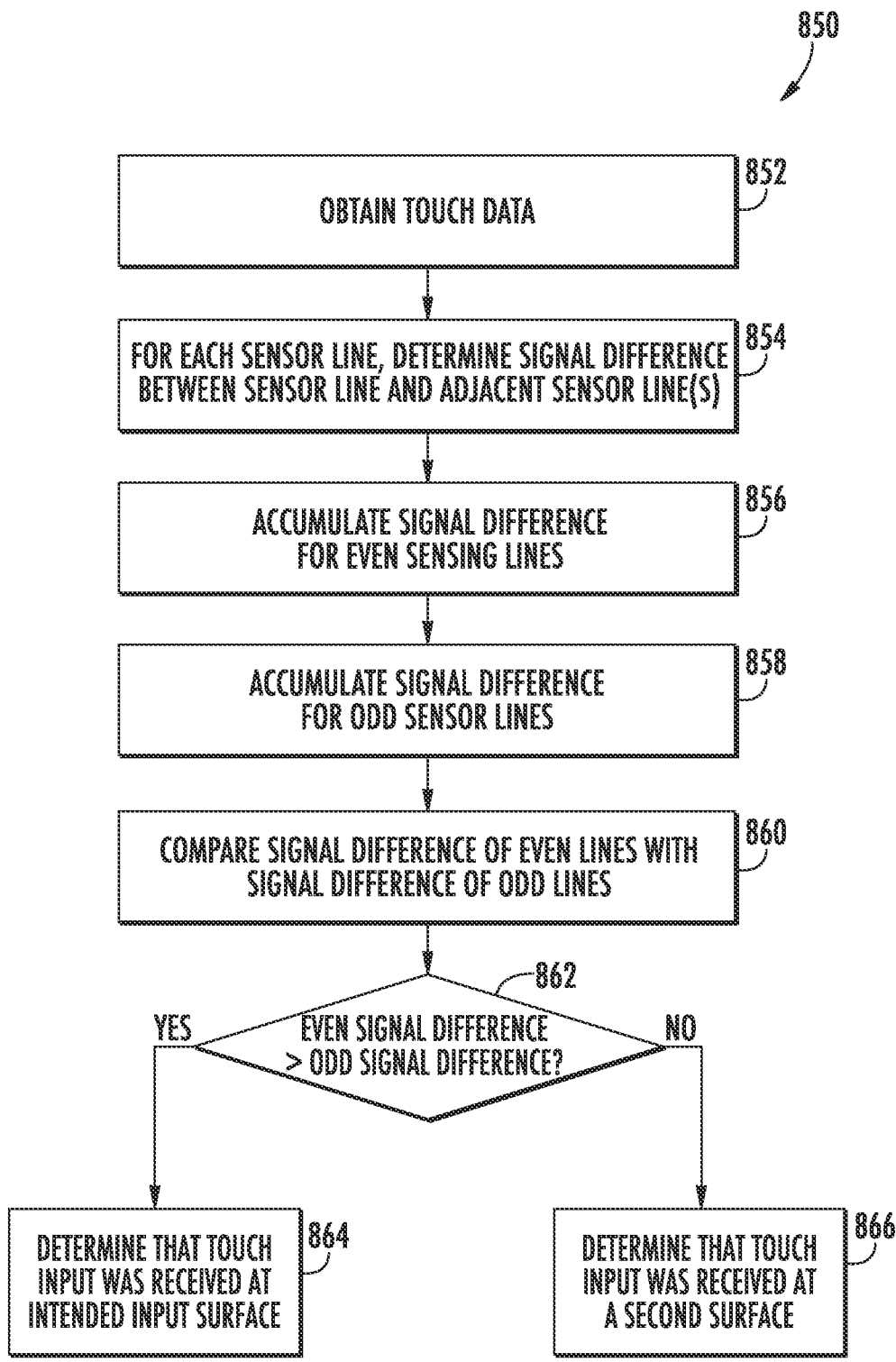
FIG. 17 is a flowchart depicting an example process of determining a surface at which a touch input is received based at least in part on a response of a set of sensing elements in accordance with example embodiments of the present disclosure.

FIG. 17 depicts a flowchart describing an example method of identifying a surface of a touch sensor at which a touch input is received based on a respective response of sensing elements of individuals subsets of the touch sensor in accordance with example embodiments of the present disclosure.

At 852, method 850 can include obtaining touch data. The touch data may indicate a respective response of each sensing element to a touch input. The touch data may indicate a capacitance of each sensing element in response to the touch input.

At 854, method 850 can include determining, for each sensor element, a signal difference between the sensor element and one or more adjacent sensor elements. Gesture manager 161 can determine a difference in capacitance between a sensing element and its adjacent sensing elements in the lateral direction. By way of example, for each even sensing element of the touch sensor, a signal difference between the even sensing element and one or more odd sensing elements adjacent to the even sensing element in a lateral direction can be determined. Similarly, for each odd sensing element of the touch sensor, a signal difference between the odd sensing element and one or more even sensing elements adjacent in the lateral direction can be determined.

At 856, method 850 can include accumulating the signal difference of each even sensing element. For example, the signal difference of each even sensing element can be summed together to generate an accumulated signal difference for the subset of even sensing elements. In this regard, the accumulated signal difference for the even sensing elements can be based at least in part on two signal differences associated with at least two conductive sensing elements of the even subset.

At 858, method 850 can include accumulating the signal difference of each odd sensing element. For example, the signal difference of each odd sensing element can be summed together to generate an accumulated signal difference for the subset of odd sensing elements. In this regard, the accumulated signal difference for the odd sensing elements can be based at least in part on two signal differences associated with at least two conductive sensing elements of the even subset.

At 860, method 850 can include comparing the accumulated signal difference of the even subset of sensing elements with the accumulated signal difference of the odd subset of sensing elements. At 862, method 850 can include determining whether the accumulated signal difference for the even sensing elements is greater than the accumulated signal difference for the odd sensing elements. In some examples, gesture manager 161 can determine whether the difference between the even signal difference and the odd signal difference meets or exceeds a threshold. For example, gesture manager 161 can determine whether the even signal difference exceeds the odd signal difference by a threshold. If the even signal difference is greater than the odd signal difference, method 850 proceeds to 864. If the even signal difference is not greater than the odd signal different, method 850 proceeds to 866.

At 864, method 850 can include determining that the touch input was received at the intended input surface. At 866, method 850 can include determining that the touch input was received at a second surface of the touch sensor.

FIG. 18 depicts a block diagram of an example computing environment 900 that can be used to implement any type of computing device as described herein. The system environment includes a remote computing system 902, an interactive computing system 920, and a training computing system 940 that are communicatively coupled over a network 960. The interactive computing system 920 can be used to implement an interactive object in some examples.

The remote computing system 902 can include any type of computing device, such as, for example, a personal computing device (e.g., laptop or desktop), a mobile computing device (e.g., smartphone or tablet), a gaming console or controller, an embedded computing device, a server computing device, or any other type of computing device.

The remote computing system 902 includes one or more processors 904 and a memory 906. The one or more processors 904 can be any suitable processing device (e.g., a processor core, a microprocessor, an ASIC, a FPGA, a controller, a microcontroller, etc.) and can be one processor or a plurality of processors that are operatively connected. The memory 906 can include one or more non-transitory computer-readable storage mediums, such as RAM, ROM, EEPROM, EPROM, flash memory devices, magnetic disks, etc., and combinations thereof. The memory 906 can store data 908 and instructions 910 which are executed by the processor 904 to cause the remote computing system 902 to perform operations.

The remote computing system 902 can also include one or more input devices 912 that can be configured to receive user input. By way of example, the one or more input devices 912 can include one or more soft buttons, hard buttons, microphones, scanners, cameras, etc. configured to receive data from a user of the remote computing system 902. For example, the one or more input devices 912 can serve to implement a virtual keyboard and/or a virtual number pad. Other example user input devices 912 include a microphone, a traditional keyboard, or other means by which a user can provide user input.

The remote computing system 902 can also include one or more output devices 914 that can be configured to provide data to one or more users. By way of example, the one or more output device(s) 914 can include a user interface configured to display data to a user of the remote computing system 902. Other example output device(s) 914 include one or more visual, tactile, and/or audio devices configured to provide information to a user of the remote computing system 902.

The interactive computing system 920 can be used to implement any type of interactive object such as, for example, a wearable computing device. The interactive computing system 920 includes one or more processors 922 and a memory 924. The one or more processors 922 can be any suitable processing device (e.g., a processor core, a microprocessor, an ASIC, a FPGA, a controller, a microcontroller, etc.) and can be one processor or a plurality of processors that are operatively connected. The memory 924 can include one or more non-transitory computer-readable storage mediums, such as RAM, ROM, EEPROM, EPROM, flash memory devices, magnetic disks, etc., and combinations thereof. The memory 924 can store data 926 and instructions 928 which are executed by the processor 922 to cause the interactive computing system 920 to perform operations.

The interactive computing system 920 can also include one or more input devices 930 that can be configured to receive user input. For example, the user input device 930 can be a touch-sensitive component (e.g., a touch sensor 102) that is sensitive to the touch of a user input object (e.g., a finger or a stylus). As another example, the user input device 930 can be an inertial component (e.g., inertial measurement unit 158) that is sensitive to the movement of a user. Other example user input components include a microphone, a traditional keyboard, or other means by which a user can provide user input. The interactive computing system 920 can also include one or more output devices 932 configured to provide data to a user. For example, the one or more output devices 932 can include one or more visual, tactile, and/or audio devices configured to provide the information to a user of the interactive computing system 920.

The training computing system 940 includes one or more processors 942 and a memory 944. The one or more processors 942 can be any suitable processing device (e.g., a processor core, a microprocessor, an ASIC, a FPGA, a controller, a microcontroller, etc.) and can be one processor or a plurality of processors that are operatively connected. The memory 944 can include one or more non-transitory computer-readable storage mediums, such as RAM, ROM, EEPROM, EPROM, flash memory devices, magnetic disks, etc., and combinations thereof. The memory 944 can store data 946 and instructions 948 which are executed by the processor 942 to cause the training computing system 940 to perform operations. In some implementations, the training computing system 940 includes or is otherwise implemented by one or more server computing devices.

The training computing system 940 can include a model trainer 952 that trains a machine-learned classification model 950 using various training or learning techniques, such as, for example, backwards propagation of errors. In other examples as described herein, training computing system 940 can train machine-learned classification model 950 using training data 954. For example, the training data 954 can include labeled sensor data generated by interactive computing system 920. The training computing system 940 can receive the training data 954 from the interactive computing system 920, via network 960, and store the training data 954 at training computing system 940. The machine-learned classification model 950 can be stored at training computing system 940 for training and then deployed to remote computing system 902 and/or the interactive computing system 920. In some implementations, performing backwards propagation of errors can include performing truncated backpropagation through time. The model trainer 952 can perform a number of generalization techniques (e.g., weight decays, dropouts, etc.) to improve the generalization capability of the classification model 950.

In particular, the training data 954 can include a plurality of instances of sensor data, where each instance of sensor data has been labeled with ground truth inferences such as one or more predefined movement recognitions. For example, the label(s) for each instance of sensor data can describe the position and/or movement (e.g., velocity or acceleration) of an object movement. In some implementations, the labels can be manually applied to the training data by humans. In some implementations, the machine-learned classification model 950 can be trained using a loss function that measures a difference between a predicted inference and a ground-truth inference.

The model trainer 952 includes computer logic utilized to provide desired functionality. The model trainer 952 can be implemented in hardware, firmware, and/or software controlling a general purpose processor. For example, in some implementations, the model trainer 952 includes program files stored on a storage device, loaded into a memory and executed by one or more processors. In other implementations, the model trainer 952 includes one or more sets of computer-executable instructions that are stored in a tangible computer-readable storage medium such as RAM hard disk or optical or magnetic media.

In some examples, a training database 956 can be stored in memory on an interactive object, removable electronics module, user device, and/or a remote computing device. For example, in some embodiments, a training database 956 can be stored on one or more remote computing devices such as one or more remote servers. The machine-learned classification model 950 can be trained based on the training data in the training database 956. For example, the machine-learned classification model 950 can be learned using various training or learning techniques, such as, for example, backwards propagation of errors based on the training data from training database 956.

In this manner, the machine-learned classification model 950 can be trained to determine at least one of a plurality of predefined movement(s) associated with the interactive object based on movement data.

The machine-learned classification model 950 can be trained, via one or more machine learning techniques using training data. For example, the training data can include movement data previously collected by one or more interactive objects. By way of example, one or more interactive objects can generate sensor data based on one or more movements associated with the one or more interactive objects. The previously generated sensor data can be labeled to identify at least one predefined movement associated with the touch and/or the inertial input corresponding to the sensor data. The resulting training data can be collected and stored in a training database 956.

The network 960 can be any type of communications network, such as a local area network (e.g., intranet), wide area network (e.g., Internet), or some combination thereof and can include any number of wired or wireless links. In general, communication over the network 960 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 24 illustrates one example computing system that can be used to implement the present disclosure. Other computing systems can be used as well. For example, in some implementations, the remote computing system 902 can include the model trainer 952 and the training data 954. In such implementations, the classification model 950 can be trained and used locally at the remote computing system 902. In some of such implementations, the remote computing system 902 can implement the model trainer 952 to personalize the classification model 950 based on user-specific movements.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A sensor system, comprising:
a flexible substrate having a first surface and a further, second surface, the flexible substrate defining a longitudinal direction and a lateral direction;
a first subset of non-crossing sensing elements having a length in the longitudinal direction and a width in the lateral direction, the first subset of non-crossing sensing elements coupled to the first surface of the flexible substrate;
a second subset of non-crossing sensing elements having a length in the longitudinal direction and a width in the lateral direction, the second subset of non-crossing sensing elements coupled to the second surface, wherein a first sensing element of the first subset of non-crossing sensing elements overlaps, in the lateral direction, a portion of a second sensing element of the second subset of non-crossing sensing elements and a portion of a third sensing element of the second subset of non-crossing sensing elements; and
one or more control circuits configured to determine whether a touch input is associated with the first surface or the second surface based at least in part on a respective capacitive response to the touch input by the first sensing element, the second sensing element, and the third sensing element, the one or more control circuits configured to initiate a functionality based at least in part on a determined touch input surface, wherein the one or more control circuits are configured to detect touch inputs by:
applying a scanning voltage to each sensing element of the first subset of non-crossing sensing elements and sensing a capacitance associated with such sensing element while applying a reference voltage to the second subset of non-crossing sensing elements and each other sensing element of the first subset of non-crossing sensing elements, the scanning voltage is greater than the reference voltage; and
applying the scanning voltage to each sensing element of the second subset of non-crossing sensing elements and sensing a capacitance associated with such sensing element while applying the reference voltage to the first subset of non-crossing sensing elements and each other sensing element of the second subset of sensing elements.

2. The sensor system of claim 1, wherein the one or more control circuits are configured to determine whether the touch input is associated with the first surface or the second surface based at least in part on:
determining a respective response to the touch input by the first subset of non-crossing sensing elements and the second subset of non-crossing sensing elements.

3. The sensor system of claim 2, wherein the one or more control circuits are configured to determine whether the touch input is associated with the first surface or the second surface by:
determining that the touch input is associated with the first surface in response to a larger capacitive response to the touch input by the first subset of non-crossing sensing elements relative to the second subset of non-crossing sensing elements; and
determining that the touch input is associated with the second surface in response to a larger capacitive response to the touch input by the second subset of non-crossing sensing elements relative to the first subset of non-crossing sensing elements.

4. The sensor system of claim 1, wherein in response to the touch input being at the first surface:
the one or more control circuits applying the scanning voltage to a selected sensing element of the second subset of sensing elements and sensing a capacitance associated with the selected sensing element while applying the reference voltage to the first subset of non-crossing sensing elements comprises attenuating an electric field associated with the touch input and application of the scanning voltage to the selected sensing element.

5. The sensor system of claim 1, wherein:
each sensing element of the first subset of non-crossing sensing elements and the second subset of sensing elements has a first longitudinal edge and a second longitudinal edge defining the width of the first sensing element, the first longitudinal edge and the second longitudinal edge extending in the longitudinal direction;
the first longitudinal edge of the first sensing element is laterally positioned between the first longitudinal edge and the second longitudinal edge of the second sensing element; and
the second longitudinal edge of the first sensing element is laterally positioned between the first longitudinal edge and the second longitudinal edge of the third sensing element.

6. The sensor system of claim 5, wherein:
the first longitudinal edge of a fourth sensing element of the first subset of non-crossing sensing elements is laterally aligned between the first longitudinal edge and the second longitudinal edge of the second sensing element; and
the second longitudinal edge of the fourth sensing element is laterally aligned between the first longitudinal edge and the second longitudinal edge of a fifth sensing element.

7. The sensor system of claim 1, wherein:
the first subset of non-crossing sensing elements is a first subset of parallel sensing elements and the second subset of non-crossing sensing elements is a second subset of parallel sensing elements.

8. The sensor system of claim 7, wherein:
each parallel sensing element of the first subset of parallel sensing elements and the second subset of parallel sensing elements includes a conductive thread that defines the length of such parallel sensing element in the longitudinal direction and the width of such parallel sensing element in the lateral direction.

9. The sensor system of claim 8, wherein:
the width of each parallel sensing element is at least partially defined by a thread profile of such conductive thread forming such parallel sensing element, the thread profile including a first plurality of thread peaks that define a first longitudinal edge of such parallel sensing element and a second plurality of peaks that define a second longitudinal edge of such parallel sensing element; and
the width of such parallel sensing element extends between the first longitudinal edge and the second longitudinal edge.

10. The sensor system of claim 1, wherein the one or more control circuits are configured to initiate the functionality in response to the touch input based at least in part on the respective capacitive response to the touch input by at least one non-crossing sensing element of the first subset and at least one non-crossing sensing element of the second subset.

11. The sensor system of claim 1, wherein the first surface and the second surface are opposite surfaces of the flexible substrate.

12. The sensor system of claim 1, wherein:
the lateral direction and the longitudinal direction are orthogonal directions.

13. An interactive object, comprising:
a touch sensor comprising a plurality of non-crossing sensing elements integrated with a flexible substrate, each of the plurality of non-crossing sensing elements defining a length in a longitudinal direction and a width in a lateral direction, the plurality of non-crossing sensing elements comprising:
a first subset of non-crossing sensing elements coupled to a first surface of the flexible substrate;
a second subset of non-crossing sensing elements coupled to a second, further surface of the flexible substrate;
wherein the first subset of non-crossing sensing elements comprises a first non-crossing sensing element that overlaps, in the lateral direction, at least a portion of a second non-crossing sensing element and a third non-crossing sensing element of the second subset; and
one or more control circuits configured to determine whether a touch input is associated with the first surface or the second surface based at least in part on a respective response to the touch input by the plurality of non-crossing sensing elements and to initiate a functionality in response to the touch input based at least in part on a determined surface to which the touch input is applied, and wherein the one or more control circuits are configured to detect touch inputs by:
applying a scanning voltage to each sensing element of the first subset of non-crossing sensing elements and sensing a capacitance associated with such sensing element while applying a reference voltage to the second subset of non-crossing sensing elements and each other sensing element of the first subset of non-crossing sensing elements, the scanning voltage is greater than the reference voltage; and
applying the scanning voltage to each sensing element of the second subset of non-crossing sensing elements and sensing a capacitance associated with such sensing element while applying the reference voltage to the first subset of non-crossing sensing elements and each other sensing element of the second subset of sensing elements.

14. The interactive object of claim 13, wherein the one or more control circuits applying the scanning voltage to the first non-crossing sensing element while applying the reference voltage to each remaining non-crossing sensing element of the plurality of non-crossing sensing elements comprises attenuating a signal generated from the first non-crossing sensing element when the reference voltage is applied to each remaining non-crossing sensing element.

15. The interactive object of claim 14, wherein:
the touch input is received at the second surface; and
applying the reference voltage to the second subset of non-crossing sensing elements comprises attenuating the signal generated from the first non-crossing sensing element.

16. A computer-implemented method of managing input at an interactive object, the method comprising:
obtaining, by one or more processors, touch data associated with a touch sensor comprising a plurality of non-crossing sensing elements integrated with a flexible substrate, each of the plurality of non-crossing sensing elements defining a length in a longitudinal direction and a width in a lateral direction, the plurality of non-crossing sensing elements comprising a first subset of non-crossing sensing elements coupled to a first surface of the flexible substrate and a second subset of non-crossing sensing elements coupled to a second, further surface of the flexible substrate, wherein the first subset of non-crossing sensing elements comprises a first non-crossing sensing element that overlaps, in the lateral direction, at least a portion of a second non-crossing sensing element and a third non-crossing sensing element of the second subset;
detecting, by the one or more processors, a respective response associated with each of the plurality of non-crossing sensing elements in response to a touch input to the touch sensor; and
determining, by the one or more processors, whether the touch input is associated with the first surface or the second surface based at least in part on the respective response associated with each of the plurality of non-crossing sensing elements, wherein detecting touch inputs comprises:
applying a scanning voltage to each sensing element of the first subset of non-crossing sensing elements and sensing a capacitance associated with such sensing element while applying a reference voltage to the second subset of non-crossing sensing elements and each other sensing element of the first subset of non-crossing sensing elements, the scanning voltage is greater than the reference voltage; and
applying the scanning voltage to each sensing element of the second subset of non-crossing sensing elements and sensing a capacitance associated with such sensing element while applying the reference voltage to the first subset of non-crossing sensing elements and each other sensing element of the second subset of sensing elements.

17. The computer-implemented method of claim 16, wherein in response to the touch input being at the first surface, applying the scanning voltage to a selected sensing element of the second subset of non-crossing sensing elements and sensing a capacitance associated with the selected sensing element while applying the reference voltage to the first subset of non-crossing sensing elements comprises:
attenuating an electric field associated with the touch input and application of the scanning voltage to the selected sensing element.

* * * * *